United States Patent
Kruse et al.

(10) Patent No.: US 10,864,853 B2
(45) Date of Patent: Dec. 15, 2020

(54) APPARATUS, VEHICLE INFORMATION SYSTEM AND METHOD

(71) Applicant: OSRAM Opto Semiconductors GmbH, Regensburg (DE)

(72) Inventors: Kevin Kruse, Commerce, MI (US); Kimberly Peiler, Northville, MI (US); Johnathan Weiser, Northville, MI (US)

(73) Assignee: OSRAM OPTO SEMICONDUCTORS GMBH, Regensburg (DE)

( * ) Notice: Subject to any disclaimer, the term of this patent is extended or adjusted under 35 U.S.C. 154(b) by 0 days.

(21) Appl. No.: 15/885,496

(22) Filed: Jan. 31, 2018

(65) Prior Publication Data

US 2019/0232869 A1    Aug. 1, 2019

(51) Int. Cl.
| | |
|---|---|
| *B60Q 9/00* | (2006.01) |
| *B60Q 3/80* | (2017.01) |
| *B60Q 3/70* | (2017.01) |
| *B60K 35/00* | (2006.01) |
| *G02B 27/01* | (2006.01) |

(52) U.S. Cl.
CPC ............ *B60Q 9/00* (2013.01); *B60K 35/00* (2013.01); *B60Q 3/70* (2017.02); *B60Q 3/80* (2017.02); *B60K 2370/149* (2019.05); *B60K 2370/155* (2019.05); *B60K 2370/1529* (2019.05); *B60K 2370/186* (2019.05); *B60K 2370/193* (2019.05); *B60K 2370/21* (2019.05); *B60K 2370/31* (2019.05); *G02B 2027/0138* (2013.01)

(58) Field of Classification Search
CPC ................................ B60K 35/00; B60K 37/02
USPC .......................................................... 340/438
See application file for complete search history.

(56) References Cited

U.S. PATENT DOCUMENTS

| | | | |
|---|---|---|---|
| 2003/0141967 A1 | 7/2003 | Aichi et al. | |
| 2006/0262140 A1* | 11/2006 | Kujawa | G06T 19/006 345/633 |
| 2007/0070197 A1 | 3/2007 | Akatsuka et al. | |
| 2010/0289632 A1* | 11/2010 | Seder | G06K 9/00805 340/436 |
| 2010/0302020 A1 | 12/2010 | Lenneman et al. | |
| 2013/0251168 A1 | 9/2013 | Takazawa | |
| 2014/0244115 A1 | 8/2014 | Sanma et al. | |
| 2016/0144785 A1* | 5/2016 | Shimizu | B60R 11/02 340/435 |

(Continued)

FOREIGN PATENT DOCUMENTS

| | | |
|---|---|---|
| DE | 10300275 A1 | 8/2003 |
| DE | 10354104 A1 | 6/2005 |

(Continued)

*Primary Examiner* — Joseph H Feild
*Assistant Examiner* — Sharmin Akhter
(74) *Attorney, Agent, or Firm* — Slater Matsil, LLP

(57) ABSTRACT

An apparatus includes an information system with at least one pattern generator having a plurality of light nodes, each light node including at least one light emitting element, such as an LED. The at least one pattern generator is positioned with regard to a user of the apparatus such that it is located in the peripheral view of the user. A controller is operatively coupled to the pattern generator and configured to selectively initiate the generation of a visual light pattern on the pattern generator, the visual light pattern being indicative of information which is to be provided to the user of the apparatus.

20 Claims, 9 Drawing Sheets

(56) References Cited

U.S. PATENT DOCUMENTS

| | | | |
|---|---|---|---|
| 2016/0196098 A1* | 7/2016 | Roth | B60Q 9/00 |
| | | | 715/761 |
| 2017/0158056 A1* | 6/2017 | Takamatsu | B60K 35/00 |
| 2018/0086346 A1 | 3/2018 | Fujisawa et al. | |
| 2018/0302556 A1* | 10/2018 | Baran | H04N 5/23238 |
| 2019/0278094 A1* | 9/2019 | Huang | G02B 27/0179 |

FOREIGN PATENT DOCUMENTS

| | | |
|---|---|---|
| DE | 102009002979 A1 | 11/2010 |
| DE | 102013204798 A1 | 9/2013 |
| DE | 102013006068 A1 | 10/2014 |
| DE | 102013019114 A1 | 5/2015 |
| DE | 102014222822 A1 | 5/2016 |
| DE | 102014226026 A1 | 6/2016 |
| DE | 102015215180 A1 | 2/2017 |
| DE | 102015012309 A1 | 3/2017 |
| DE | 102015225343 A1 | 6/2017 |
| DE | 102017203515 A1 | 9/2018 |
| DE | 102017213301 A1 | 2/2019 |
| JP | 2016196289 A | 11/2016 |
| WO | 2017005400 A1 | 1/2017 |

* cited by examiner

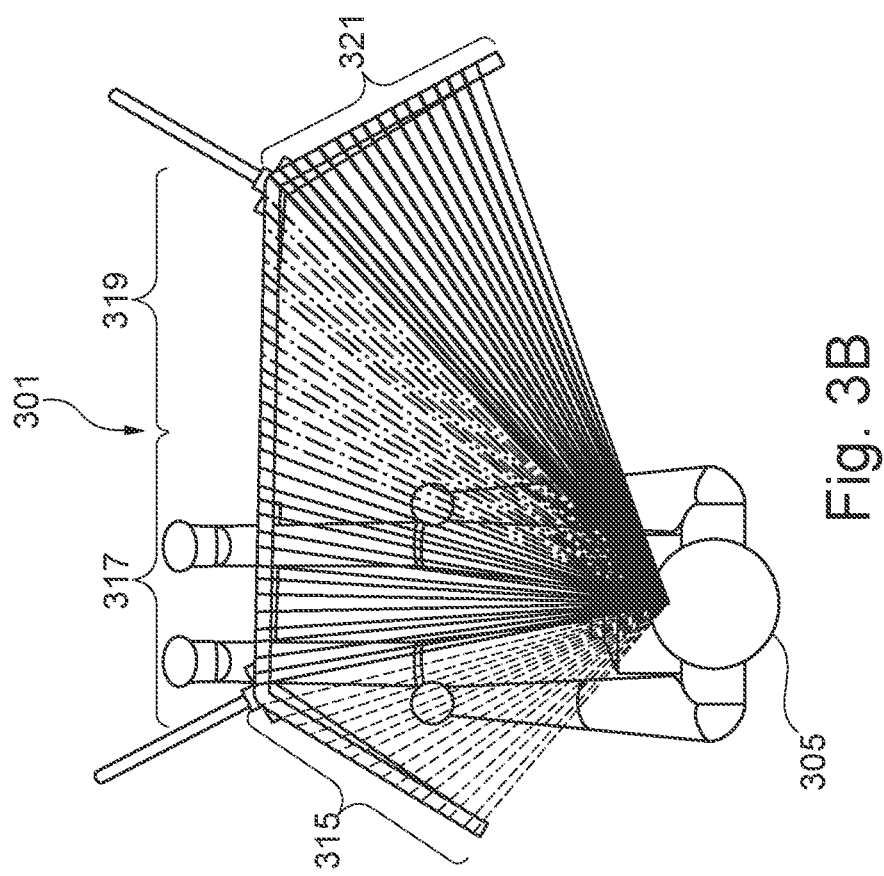
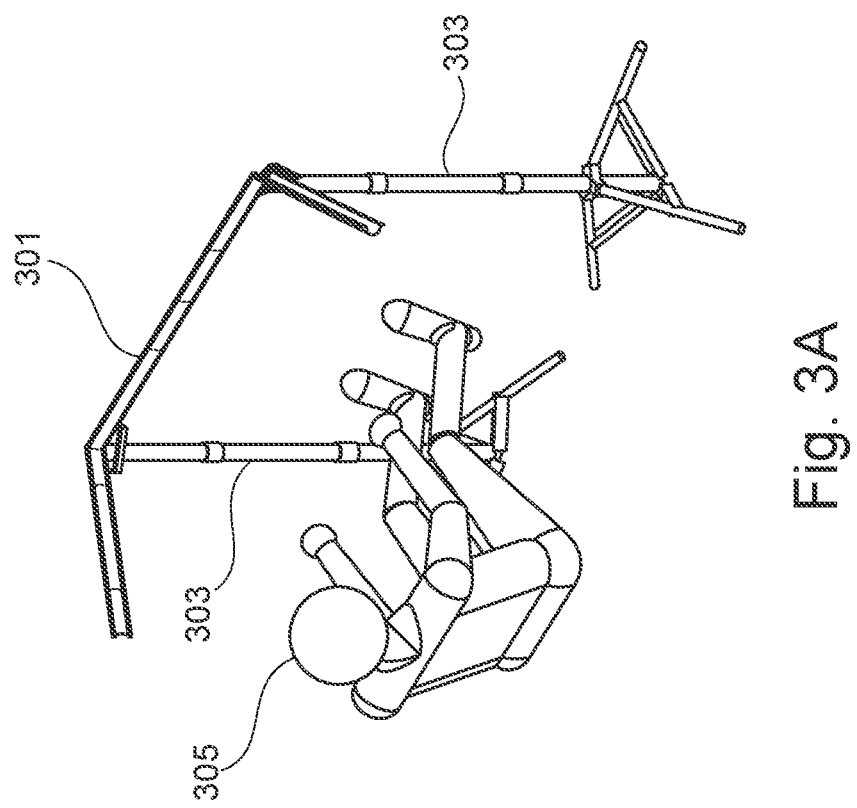

APPARATUS, VEHICLE INFORMATION SYSTEM AND METHOD

TECHNICAL FIELD

The present disclosure relates to an apparatus, a vehicle information system and a method of providing information to a user, such as an occupant of a vehicle.

BACKGROUND

In vehicles drivers and other occupants may use different displays such as instrument panels and navigation systems. These displays usually require significant attention from the occupant in order to enable the occupant to grasp the information provided on the displays. For example, a driver may have to move his head or body in order to place a display in his central field of view and to be able to read text on the display. Refocusing and interpreting the meaning of text, images, or icons at different locations on the displays may also be required.

Moreover, users of apparatuses, such as an electronic device or a vehicle, may be focused on a viewing window through or at which a user looks when using the apparatus. There may be a need to provide such users with additional information outside of the viewing window, for example, to provide a warning or another type of information to the user.

Accordingly, it is desirable to provide apparatuses, systems and methods to present information, such as surrounding information, vehicle surrounding information, operating information and data and other forms of information, to a user such that the user is enabled to quickly and easily grasp the information without having to pay significant attention and without having to move his body or head in order to place the visual source of the information in his central field of view.

SUMMARY

The present invention has been conceived in order to address this situation. At least in some embodiments the present invention seeks to provide an apparatus, such as a vehicle with a vehicle information system, which overcomes or ameliorates at least some of the above mentioned shortcomings.

In a non-limiting embodiment, an apparatus comprises a viewing window, such as a display of an electronic device or a windshield of a vehicle or an object like a book or tablet, at or through which a user looks under normal circumstances when using the apparatus. An information system includes at least one pattern generator having a plurality of light nodes. Each light node comprises at least one light emitting element, such as an LED. The at least one pattern generator is positioned with regard to the viewing window such that it is located in the peripheral view of the user when the user looks at or through the viewing window. The information system also includes a controller being operatively coupled to the pattern generator and configured to selectively initiate the generation of a visual light pattern on the pattern generator. The visual light pattern is indicative of information that is to be provided to the user of the apparatus.

The apparatus may, for example, be a vehicle or an electronic device such as an augmented reality system, e.g., augmented reality glasses. The user of such an apparatus usually focuses on a viewing window when using the apparatus. The information system is able to provide information, such as a warning information or another type of information, to the user via the at least one pattern generator located in the peripheral view of the user when the user looks at the viewing window. The user may therefore be enabled to view the displayed visual light pattern using his peripheral vision. This is a part of the human vision that occurs outside of the very center of gaze. Peripheral vision will be described in more detail further below.

Using peripheral vision, a user is in particular enabled to recognize well-known structures and forms with basically no need to focus by the foveal line of sight. The described apparatus exploits this as the pattern generator allows the user to grasp the information associated with the displayed visible light pattern using his peripheral vision and without having to focus his central vision and more specifically his foveal line of sight on the pattern generator.

In an example apparatus, the controller is adapted to select the visual light pattern from a plurality of light patterns. The plurality of light patterns may be stored, in form of digital data, on storage space of the apparatus. The plurality of light patterns may also be accessibly by the controller on an external source, such as the internet. The plurality of light patterns may not be "frozen" and unchangeable. Rather, it may be possible to update at least some of the light patterns of the plurality of light patterns and/or to add or remove light patterns to or from the plurality of light patterns.

In an example apparatus, the controller is connected or connectable to at least one information provider for receiving from the information provider data related to at least one of the apparatus and the user. The information provider may comprise at least one sensor of the apparatus. For example, if the apparatus is a vehicle, the sensor may be a vehicle sensor or a camera monitoring the interior of the vehicle.

The information provider may be a navigation system of a vehicle or another system of a vehicle which can provide information or data.

The information provider may be the internet or an internet service such as a cloud service accessible via the internet. The information provider may be a wearable electronic device, such as a fitness tracker, which may be worn by a user of the apparatus and to which the controller can be connected, e.g., via Bluetooth.

The data received from the at least one information provider may be any kind of data associated with the apparatus and/or the user. For example, the apparatus may be a vehicle and the controller may receive from at least one information provider, such as a sensor of the vehicle, a system of the vehicle, an internet service, a wearable, another vehicle via vehicle-to-vehicle-communication at least one of the following information or other information:

Medical data about the user: Medical data may, for example, include information about color blindness or epilepsy of the user, whether the user suffers from motion slowness or has a sleep deficit. The medical data may include information obtainable from a wearable, such as the heart rate of the user, or other live monitoring devices.

User preferences: This may, for example, include information about preferred colors of the user, etc.

User information: A camera in the vehicle may be used to obtain information about an orientation or gaze direction of a user of the vehicle.

Traffic data: Traffic data may include the actual position of the vehicle, the travelling route, the traffic situation around the vehicle and/or along the travelling route, etc. Traffic data may include information about road conditions, including, for example, information about potholes or other information obtainable via crowd source mapping.

Emergency data: This may include information about an emergency vehicle possibly crossing the traveling route of the vehicle. Such information may be obtained via the internet from a respective internet service. The emergency data may be obtained from other vehicles driven, for example, ahead of the user's vehicle.

Weather data: Weather data, which may be specific for the vicinity of the vehicle, may be obtainable via the internet.

In an example apparatus, the controller is configured to modify the visual light pattern in dependence on the received data and to initiate the generation of the modified visual light pattern on the pattern generator. The visualization of the unmodified light pattern may be foregone.

The visual light pattern may be obtained from a database, for example, and may be regarded as a basic light pattern which is modified by the controller in dependence on the obtained data.

For the information that is to be provided to the user, there may be such a basic light pattern available or able to be generated. This may be displayed via the pattern generator in its basic form or in a modified version. There may therefore be a mapping of information, such as vehicle information and status, into a base pattern that may be displayed or modified.

For example, the received data may reveal that the user suffers from color blindness, for example, a red-green-color blindness, and the controller may modify the basic light pattern such that the modified light pattern does not include red and green color. According to another example, the obtained data may indicate that an emergency vehicle is ahead, and the controller may modify the light intensity of the light pattern in dependence on the distance of the emergency vehicle with respect to the vehicle. Furthermore, the position where the light pattern is generated on the pattern generator may reflect the direction from which the emergency vehicle is expected to approach the vehicle. According to a further example, the data may reveal that the user prefers a specific color, for example blue, and the controller may modify the basic light pattern such that the modified light pattern is output in blue color.

The visible light pattern may also be obtained, derived or modified by use of at least one algorithm. The controller may be adapted to execute the algorithm implemented in form of software code which is executed by the controller. This algorithm may be able to evolve or change a basic light pattern, which may be predefined, based on additional information available. The basic light pattern and/or a modified light pattern may be derived from the algorithm based on sensor inputs and other data available about a user of the apparatus, for example, in case of a vehicle in dependence on the vehicle situation. For example, via a cloud service, information may be available to the controller with regard to at least one of the following: the passenger's health history, predisposition to motion sickness, vision medical history, e.g., color blindness, passenger's history of responsiveness and reaction to the previous light patterns, location of static road hazards like potholes, map data of school locations, map data of construction sites, real time traffic data, emergency vehicle dispatch information, personal preferences to colors, etc.

The algorithm may be a self-learning algorithm and learn, evolve and/or adjust a visual light pattern in dependence on previous situations.

In an example, the apparatus is a vehicle and the information system is a vehicle information system, and the at least one pattern generator is positioned within an interior of the vehicle such that it is viewable in peripheral view by the user, in particular an occupant of the vehicle, when the user is looking forward through a windshield of the vehicle.

The pattern generator may further be positioned such that it is viewable in peripheral view by the occupant of the vehicle when the occupant is looking towards displays, gauges or instrumentation primarily positioned for viewing by the forward looking occupant.

The at least one visual light patterns may be configured to be recognizable by the user when seen in peripheral vision. The visual light patterns may therefore be designed such that they are easy to recognize.

In an example the apparatus may comprise multiple pattern generators disposed in or at the apparatus, preferably in peripheral view of the user when the user is looking at the viewing window. In a further example, the apparatus may be a vehicle and multiple pattern generators may be disposed within the interior of the vehicle at different locations.

In an example apparatus a sensor system, in particular with at least one camera mounted in the interior of the vehicle, is configured to detect the identity, orientation, and/or gaze direction of at least one user.

In an example apparatus the sensor system is operatively coupled to the controller which is configured to determine a specific pattern generator from the multiple pattern generators in dependence on the detected identity, orientation, and/or gaze direction of the user such that the specific pattern generator is situated in the peripheral vision of the at least one user.

In an example, the controller may be operatively connected to a display which is under normal circumstances located in the central view of the user. The information may also be provided via the display in the central view. Therefore, some redundancy could be achieved. The information provided by the display in the central view may also be more specific than the information provided via the pattern generator. There can also be additional or separate information be provided via the display in the central view.

In another non-limiting embodiment, an apparatus comprises an information system with at least one pattern generator having a plurality of light nodes. Each light node comprises at least one light emitting element, such as an LED. The at least one pattern generator is positioned with regard to a user of the apparatus such that it is located in the peripheral view of the user. A controller is operatively coupled to the pattern generator and is configured to selectively initiate the generation of a visual light pattern on the pattern generator. The visual light pattern being indicative of information which is to be provided to the user of the apparatus.

The apparatus may be a vehicle and the user may be a passenger reading a book or looking at a tablet, smartphone or the like. The at least one pattern generator may be positioned in the interior of the vehicle such that it is located in the peripheral view of the user, in particular when the user is looking at the book, tablet, smartphone, etc.

In another non-limiting embodiment, an apparatus, such as a vehicle or a vehicle information system, comprises multiple pattern generators disposed in or at the apparatus at different locations. Each pattern generator has a plurality of light nodes, each light node comprising at least one light emitting element, such as an LED. A sensor system is configured to detect at least one of an orientation and gaze direction of at least one user. The sensor system is operatively coupled to a controller which is configured to determine a specific pattern generator from the multiple pattern generators in dependence on the detected orientation or gaze direction of the at least one user.

In another non-limiting embodiment, a method of providing information to a user of an apparatus comprises the step of determining a visual light pattern associated with information to be provided to the occupant. The visual light pattern is determined in dependence on data related to at least one of the apparatus and the user. The method further comprises the step of outputting the visual light pattern on at least one pattern generator configured to visualize the visual light pattern to provide the information to the user.

In another non-limiting embodiment, a vehicle information system comprises at least one pattern generator having a plurality of light nodes. Each light node comprises at least one light emitting element, such as an LED. At least one pattern generator is positioned within an interior of a vehicle to be viewable in peripheral view by an occupant of the vehicle who is looking forward through a windshield of the vehicle or towards displays, gauges or instrumentation primarily positioned for viewing by the forward looking occupant. A controller is operatively coupled to the pattern generator and configured to selectively initiate the generation of a visual light pattern, in particular of a plurality of predefined visual light patterns, on the pattern generator to provide an information associated with the light pattern to the occupant of the vehicle.

In accordance with the example, the pattern generator is viewable in peripheral view by the occupant, which may be the person seated in the driver's seat, when the occupant is looking forward through the windshield or on common displays, gauges or instrumentation that may be located at the vehicle's dashboard or the like. Therefore the pattern generator is placed in the periphery of the visual field of the occupant such that the occupant is enabled to view the generated pattern using peripheral vision. This is a part of human vision that occurs outside the very center of gaze.

A broad set of non-central points is included in the visual field which is included in the notion of peripheral vision. Peripheral vision is usually divided into "far peripheral" vision which refers to the area at the edges of the visual field, "mid peripheral" vision which exists in the middle of the peripheral visual field, and "near-peripheral" vision exists adjacent to the so-called macular vision.

The human sensory cells within the eye such peripheral light communication system is engaging are different than the sensory cells used for central vision. In the periphery of the human eye there are more rods than cones, and peripheral vision is usually weak in humans, in particular as far as distinguishing detail, color and shape is concerned. However, peripheral vision has a relative advantage at noticing flicker and is also relatively good at detecting motion, also at low light conditions.

Using peripheral vision, a person is in particular enabled to recognize well-known structures and forms with no need to focus by the foveal line of sight. The described vehicle information system exploits this as the pattern generator allows the occupant to grasp the information associated with a generated pattern using his peripheral vision and without having to focus his central vision and more specifically his foveal line of sight on the pattern generator.

The visual light pattern may, optionally, be selected from a plurality of light patterns. Each of the plurality of light patterns may be associated with specific information. There may be a one-to-one relationship between information which is to be provided to the occupant and a light pattern of the plurality of light patterns. For example, the vehicle may be an autonomous vehicle which may use the pattern generator to indicate to the occupant that the vehicle will turn right or left prior to actually doing the turn. In order to provide the information that a left turn will take place a first light pattern will be generated that will be indicative of a left turn. Correspondingly, a second light pattern indicative of a right turn will be generated prior to turning right. The vehicle information system may thus be regarded as a peripheral ambient communication and warning system, and the generated patterns are recognizable and identifiable by peripheral vision of an occupant.

In an example vehicle information system, each light pattern is configured to be recognizable by the occupant when seen in peripheral vision. The visualized light patterns may therefore be easy to grasp light patterns. The simplicity of using basic light patterns in the periphery of the occupant takes away the requirement to refocus attention and recognize/interpret detailed information such as that of displays with graphics and texts. The light patterns may therefore be free of text, letters and/or graphics. The possibility of recognizing the light patterns by peripheral vision allows in a non-autonomous vehicle the ability to focus on the road and driving task.

In an example vehicle information system, each light pattern, optionally of the plurality of light patterns, is associated with particular information or data that can be communicated to the occupant by generating the respective light pattern. Predefined specific information may therefore be communicated by the vehicle information system to the occupant.

The location where a light pattern is generated on the pattern generator may be associated with the information which is to be provided to the occupant. For example, the location or intended direction which shall be indicated to the occupant via the information system may become intuitive as the location of the generated light pattern implies the direction of the motion for example.

In an example vehicle information system, each light node of the pattern generator can be individually controlled by the controller. Thus it may be possible to produce a large variety of different light patterns.

In an example vehicle information system, at least one light pattern of the plurality of predefined light patterns is generated on the pattern generator by switching on, for a predetermined period of time, the light emitting elements of at least one set of light nodes of the plurality of light nodes associated with the particular light pattern while keeping switched off the light emitting elements of the remaining set of light nodes of the plurality of light nodes. A simple and easy to recognize light pattern may thereby be created.

In an example vehicle information system, at least one light pattern of the plurality of predefined light patterns is generated on the pattern generator by use of a time sequence of predefined sub-patterns of light, each sub-pattern of light being generated by switching on, for a predetermined period of time, the light emitting elements of a predefined set of light nodes of the plurality of light nodes associated with the particular sub-pattern. A moving light pattern can thereby be created which may be easily recognizable by peripheral vision. The sub-patterns may vary with regard to color, light intensity, location, and spatial orientation. The light nodes may therefore be choreographed into sequences that are, for example, intuitive to vehicle status and communication. The choreography may combine sequences of color, intensity, spatial orientation, and motion to indicate a specific status of the vehicle, planned motion for navigation, warning to trigger passenger action, etc.

The light nodes may have the ability to change color and portray both monochromatic colors such as those used for warnings as well as unsaturated colors such as those often used for interior styling, illumination, and brand colors. This may be achieved by mixing multiple color light sources, which may be present in each light node, such as green, red, and blue for example. Other colors may also be included.

The at least one light pattern which is generated by use of the time sequence of predefined sub-patterns of light could be based on sub-patterns that, when played in a time sequence, provide a pattern which is intuitive with regard to vehicle status and communication. The sequence may combine sub-patterns of light with different colors, intensity, spatial orientation, and can result in a "moving" pattern which may indicate a specific status of the vehicle, a planned motion, like a turn, for navigation, or a warning to trigger passenger action.

In an example vehicle information system, the controller is configured to determine the information in dependence on a vehicle status or a planned motion of the vehicle and to determine the visual light pattern by modifying a basic light pattern or to select the visual light pattern from a plurality of light patterns based on the determined information.

There may be a database, stored, for example, on storage of the vehicle information system or remotely from the vehicle, which is accessible by the vehicle information system and in particular by the controller. In the database, each vehicle status of a plurality of vehicle states may be, in particular in a one-to-one relationship, associated with information that is to be provided to the occupant of the vehicle. The information may be, in particular in a one-to-one relationship, associated with a light pattern of the plurality of light patterns. The database may therefore be employed by the controller to select the visual light pattern based on the determined information and the associated vehicle status. By generating the selected light pattern on the pattern generator, the information and thus the vehicle status may be communicated to the occupant.

In an example vehicle information system, each light node is configured to emit light in at least one color, preferably at least one monochromatic color. Each light node may also be configured to change a color of the emitted light. Light patterns with different colors can thereby be generated. The light nodes may have the ability to change the color of the emitted light and portray both monochromatic colors such as those used for warnings as well as unsaturated colors such as those often used for interior styling, illumination, and brand colors.

In an example vehicle information system, the plurality of light nodes is arranged in a row or line. The light nodes may, for example, be arranged in form of an LED stripe or the like.

In an example vehicle information system, the at least one pattern generator is positioned on or in at least one of the following locations within the interior of the vehicle: above the windshield, along an A-pillar of the vehicle, along a B-pillar of the vehicle, along a C-pillar of the vehicle, in the vicinity of a window of the vehicle, in particular above or below the window and following a perimeter of the window, embedded in a window of the vehicle, embedded in a door of the vehicle, embedded in a material, such as a trim material, of the interior of the vehicle, in a peripheral viewing region of a head-mounted virtual, augmented, or mixed reality system of the vehicle.

The light nodes may be located outside the standard locations for information displays such as above the windshield, along the A-pillars, B-pillars, or C-pillars, following window perimeters, or embedded inside the window, doors, and trim materials of the interior. If a head-mounted virtual, augmented, or mixed reality system is worn, the light nodes could also be part of this system and may be similarly placed. An advantage of a system mounted in the periphery, such as above the windshield and front side windows, is that it should be visible by many different occupants, and it should be independent of the occupants' orientations.

In an example vehicle information system, multiple pattern generators are disposed within the interior of the vehicle at different locations. In autonomous vehicles where orientation of occupants of the vehicle may be more variable, the problem of passenger orientation, or more specifically the orientation of the field of view of the passengers, may be addressed with placing multiple pattern generators at different location within the interior of a vehicle. The multiple pattern generators may be distributed at various locations within the interior of the vehicle around the at least one occupant such as to cover peripheral vision in essentially all conceivable orientations that occupant may be. This may be particularly helpful in an autonomous vehicle where orientation of occupants may be more variable than in non-autonomous vehicles. The distributed multiple pattern generators may ensure that information can be provided to the occupant by use of at least one pattern generator which is located in the peripheral vision of that occupant. In a standard vehicle, the seat locations are known. Therefore the locations of the pattern generators and thus the locations of the light nodes can be reduced to obtain a suitable peripheral communication.

An example vehicle information system comprises a sensor system, in particular with at least one camera mounted in the interior of the vehicle. The sensor system may be configured to monitor the interior of the vehicle and to detect the orientation of at least one occupant in the vehicle. The orientation of the face or field of view of the occupant may also be detected.

A sensor system adapted to determine the orientation, position etc. of an occupant is described in German patent application no. 10 2017 213 301.5 (priority date Aug. 1, 2017). This application is incorporated by reference herein in its entirety.

The sensor system may be able to identify the orientation of the occupant or the orientation of the face or the field of view of the occupant. The determined orientation may be used to calibrate the vehicle information system.

In an example vehicle information system, the sensor system is operatively coupled to the controller, and the controller is configured to determine a specific pattern generator from the multiple pattern generators in dependence on the detected orientation of the at least one occupant in the vehicle such that the specific pattern generator is situated in the peripheral vision of the at least one occupant. The vehicle information system may therefore be calibrated, using the determined orientation of the occupant, by selecting the specific pattern generator from the multiple pattern generators which is located with respect to the orientation of the occupant (or the orientation of his face or field of view) at such a location where it is in the peripheral view of the occupant. This is particularly advantageous in an autonomous vehicle where the seat locations of the passengers may be variable.

An example vehicle information system comprises a sound generation system for providing spatially orientated sound indicating the position of the generated light pattern. Additional to visual information from a light pattern generator, spatially oriented sound can accompany the light based information such as musical sequences, sound clips embodying the information, or simply clicks and beeps as in today's conventional automotive user interfaces.

A sound generation system for a vehicle is described in German patent application no. 10 2017 203 515.3 (priority date Mar. 3, 2017). This application is incorporated by reference herein in its entirety.

An example vehicle information system comprises a haptic feedback generation system for providing haptic feedback associated with the generated light pattern.

Haptic feedback, for example, provided in a vehicle seat, armrest, or seatback, may reinforce visual and auditory cues provided by the generated visual pattern and optional sound. Using three, in particular redundant, senses—sight, sound and feel—it may be possible to clearly separate the information provided by the vehicle information system mainly via the generated at least one light pattern from other ambient light, sound or vibration.

An example vehicle information system comprises multiple pattern generators disposed within the interior of the vehicle at different locations, each pattern generator having a plurality of light nodes, each light node comprising at least one light emitting element, such as an LED, a sensor system being configured to monitor the interior of the vehicle and to detect an orientation of at least one occupant in the vehicle, the sensor system being operatively coupled to a controller which is configured to determine a specific pattern generator from the multiple pattern generators in dependence on the detected orientation of the at least one occupant in the vehicle.

The use of multiple pattern generators is—as outlined before—particularly advantageous in autonomous vehicles, as it may be possible to identify at least one pattern generator which is in the peripheral field of view of an occupant and to select this pattern generator for outputting light patterns in order to provide information to the occupant.

The term "orientation" may also refer to the orientation of the face or field of view of the occupant.

In an example vehicle information system, the specific pattern generator is situated in the peripheral vision of the at least one occupant.

In an example vehicle information system, the pattern generators are operatively coupled to the controller, and the controller is configured to selectively generate, on the specific pattern generator, a visual light pattern of a plurality of predefined visual light patterns to provide information associated with the light pattern to the occupant of the vehicle.

An example of another embodiment method of providing information to an occupant of a vehicle comprises the steps of selecting a visual light pattern from a plurality of predefined light patterns. The selected visual light pattern is associated with information to be provided to the occupant. The method further comprises selectively generating, preferably by use of a controller to which at least one pattern generator is operatively coupled, the selected visual light pattern on at least one pattern generator configured to visualize the selected visual light pattern to provide the information to the occupant.

The method may further include the step of providing the at least one pattern generator having a plurality of light nodes, each light node comprising at least one light emitting element, such as an LED, within an interior of a vehicle to be viewable in peripheral view by an occupant of the vehicle who is looking forward through a windshield of the vehicle or towards displays, gauges or instrumentation primarily positioned for viewing by a forward looking occupant.

Another embodiment vehicle information system comprises a plurality of lighting diodes arranged in an interior of a vehicle within a peripheral view of an occupant of the vehicle, in particular an occupant in a driver's seat of the vehicle, when the occupant is looking in a first direction, in particular a driving direction.

Another embodiment vehicle information system comprises a light pattern generator including a plurality of lighting diodes to generate at least one visual light pattern of a plurality of predefined visual light patterns, the plurality of lighting diodes of the light pattern generator being arranged in the vehicle such that the visual light pattern generated by the light pattern generator is in a peripheral view of an occupant of the vehicle looking in a first direction, in particular a driving direction.

Exemplary non-limiting systems and methods are set out in the following items:

1. A vehicle information system comprising:
at least one pattern generator having a plurality of light nodes, each light node comprising at least one light emitting element, such as an LED,
the at least one pattern generator being positioned within an interior of a vehicle to be viewable in peripheral view by an occupant of the vehicle who is looking forward through a windshield of the vehicle or towards displays, gauges or instrumentation primarily positioned for viewing by the forward looking occupant,
a controller being operatively coupled to the pattern generator and configured to selectively generate a visual light pattern, in particular of a plurality of predefined visual light patterns, on the pattern generator to provide an information associated with the light pattern to the occupant of the vehicle.

2. The vehicle information system of item 1, wherein the light pattern and optionally all light patterns of a plurality of predefined light patterns, is configured to be recognizable by the occupant when seen in peripheral vision.

3. The vehicle information system of one of the preceding items, wherein each light node of the pattern generator can be individually controlled by the controller.

4. The vehicle information system of one of the preceding items, wherein at least one light pattern is generated on the pattern generator by switching on, for a predetermined period of time, the light emitting elements of at least one set of light nodes of the plurality of light nodes associated with the particular light pattern while keeping switched off the light emitting elements of the remaining set of light nodes of the plurality of light nodes.

5. The vehicle information system of one of the preceding items, wherein at least one light pattern is generated on the pattern generator by use of a time sequence of predefined sub-patterns of light, each sub-pattern of light being generated by switching on, for a predetermined period of time, the light emitting elements of a predefined set of light nodes of the plurality of light nodes associated with the particular sub-pattern.

6. The vehicle information system of one of the preceding items, wherein the controller is configured to determine the information in dependence of a vehicle status or a planned motion of the vehicle and to determine the visual light pattern, optionally from a plurality of light patterns, based on the determined information, and/or wherein the controller is configured to determine the information in dependence of a vehicle status or a planned motion of the vehicle and to modify a basic visual light pattern in dependence on the determined information.

7. The vehicle information system of one of the preceding items, each light node being configured to emit light in at least one color, preferably at least one monochromatic color, and/or each light node being configured to change a color of the emitted light.

8. The vehicle information system of one of the preceding items, wherein the plurality of light nodes is arranged in a line.

9. The vehicle information system of one of the preceding items, wherein the at least one pattern generator is positioned on or in at least one of the following locations within the interior of the vehicle: above the windshield, along an A-pillar of the vehicle, along a B-pillar of the vehicle, along a C-pillar of the vehicle, in the vicinity of a window of the vehicle, in particular above or below the window and following a perimeter of the window, embedded in a window of the vehicle, embedded in a door of the vehicle, embedded in a material, such as a trim material, of the interior of the vehicle, or in a peripheral viewing region of a head-mounted virtual, augmented, or mixed reality system of the vehicle.

10. The vehicle information system of one of the preceding items, wherein multiple pattern generators are disposed within the interior of the vehicle at different locations.

11. The vehicle information system of item 10, further comprising a sensor system, in particular with at least one camera mounted in the interior of the vehicle, the sensor system being configured to monitor the interior of the vehicle and to detect the identity, orientation, and/or gaze direction of at least one occupant in the vehicle.

12. The vehicle information system of item 11, wherein the sensor system is operatively coupled to the controller, the controller being configured to determine a specific pattern generator from the multiple pattern generators in dependence on the detected identity, orientation, and/or gaze direction of the at least one occupant in the vehicle such that the specific pattern generator is situated in the peripheral vision of the at least one occupant.

13. The vehicle information system of one of the preceding items, further comprising a sound generation system for providing spatially orientated sound indicating the position of the generated light pattern.

14. The vehicle information system of one of the preceding items, further comprising a haptic feedback generation system for providing haptic feedback associated with the generated light pattern.

15. A vehicle information system comprising:
multiple pattern generators disposed within the interior of the vehicle at different locations,
each pattern generator having a plurality of light nodes, each light node comprising at least one light emitting element, such as an LED,
a sensor system being configured to monitor the interior of the vehicle and to detect an orientation of at least one occupant in the vehicle, the sensor system being operatively coupled to a controller which is configured to determine a specific pattern generator from the multiple pattern generators in dependence on the detected orientation of the at least one occupant in the vehicle.

16. The vehicle information system of item 15, wherein the specific pattern generator is situated in the peripheral vision of the at least one occupant.

17. The vehicle information system of item 15 or 16, wherein the pattern generators are operatively coupled to the controller, and
the controller being configured to selectively generate, on the specific pattern generator, a visual light pattern of a plurality of predefined visual light patterns to provide an information associated with the light pattern to the occupant of the vehicle.

18. A method of providing information to an occupant of a vehicle comprising:
selecting or deriving from an algorithm a visual light pattern from a plurality of predefined light patterns, the selected visual light pattern being associated with information to be provided to the occupant,
selectively generating, preferably by use of a controller to which at least one pattern generator is operatively coupled, the selected visual light pattern on at least one pattern generator configured to visualize the selected visual light pattern to provide the information to the occupant.

19. A vehicle information system comprising a plurality of lighting diodes arranged in an interior of a vehicle within a peripheral view of an occupant of the vehicle, in particular an occupant in a driver's seat of the vehicle, when the occupant is looking in a first direction, in particular a driving direction.

20. A vehicle information system comprising
a light pattern generator including a plurality of lighting diodes to generate at least one visual light pattern of a plurality of predefined visual light patterns,
the plurality of lighting diodes of the light pattern generator being arranged in the vehicle such that the visual
light pattern generated by the light pattern generator is in a peripheral view of an occupant of the vehicle looking in a first direction, in particular a driving direction.

BRIEF DESCRIPTION OF THE DRAWINGS

One or more examples will hereinafter be described in conjunction with the following drawing figures, where like numerals denote like elements.

FIG. 3A shows a schematic view of an exemplary embodiment of a vehicle information system;

FIG. 3B shows a schematic top view of the system of FIG. 3A;

Figure 1B:
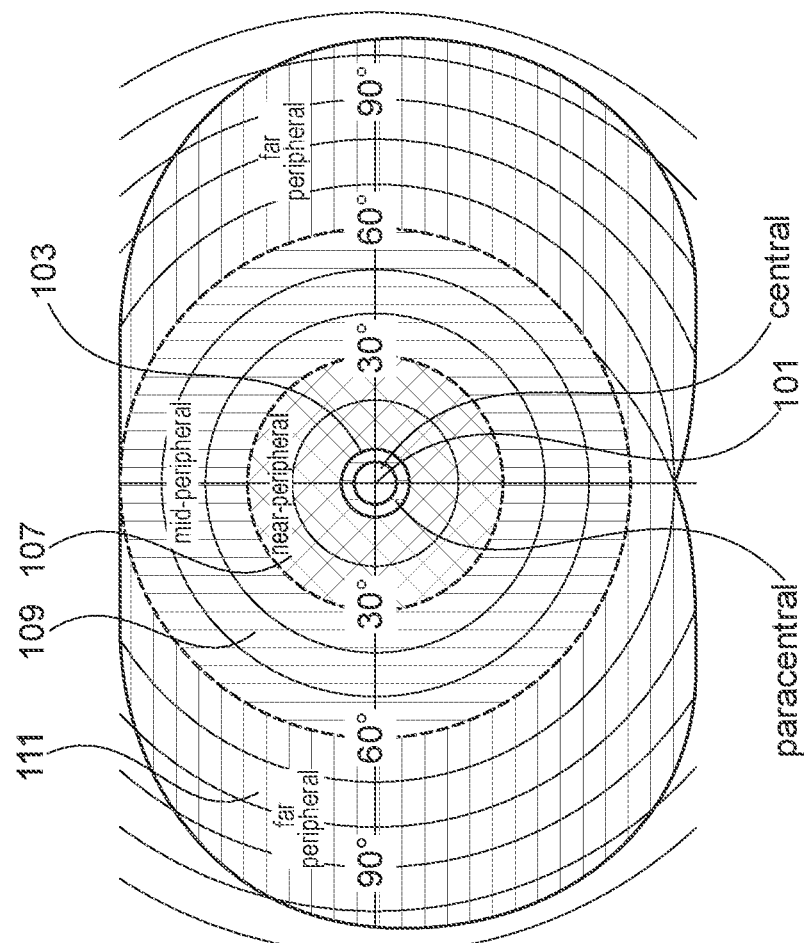
FIG. 1B is a schematic illustration of the field of view of the human eye.

The following list of reference numerals can be used with the application:
101 central vision
103 paracentral vision
105 macular vision
107 near peripheral vision
109 mid peripheral vision
111 far peripheral vision
201 dashboard
203 steering wheel
205 instrument panel
207 display 209 gauge
211 instrumentation
213 seat
215 seat
217 sun shield
219 sun shield
221 windshield
223 pattern generator
225 pattern generator
227 pattern generator
229 pattern generator
231 pattern generator
233 pattern generator
235 side window
237 A-pillar
239 A-pillar
301 pattern generator
303 tripod
305 occupant
307 traffic signal sightline
309 pattern generator sightline
311 cut-off sightline
313 forward line of sight
315 zone 1
317 zone 2
319 zone 3
321 zone 4
323 LED
325 controller
327 equipment
329 camera
331 sensor system
701 vehicle information system
703 light pattern
705 sound generation system
707 haptic feedback generation system
709 database
711 storage
713 navigation system
801 viewing window
803 pattern generator
805 controller
807 information provider
809 information provider
810 step
811 information provider
820 step
LN light node
L Left
R Right

DETAILED DESCRIPTION OF ILLUSTRATIVE EMBODIMENTS

It is common today to use visual, acoustic, and haptic indications to communicate information, for example, vehicle status information and navigation assistance, to an occupant of a vehicle. Visual information is generally designed for the central and paracentral vision systems to understand the information, and the occupant must usually refocus on such information displays to interpret the presented visual information.

Figure 1A:
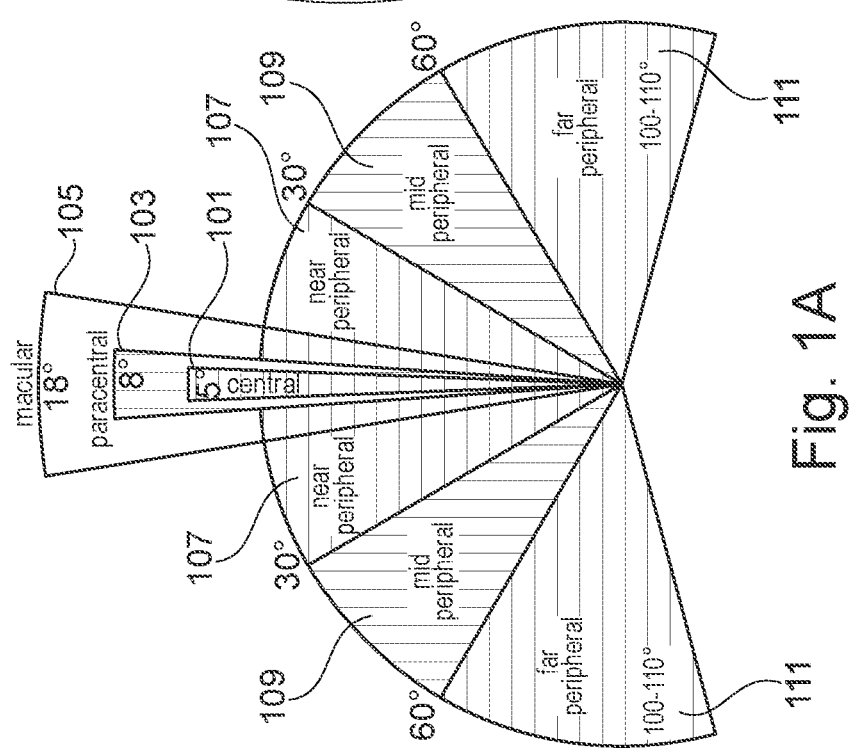
FIG. 1A is a schematic illustration of human vision.

The human eye requires very little stimulation to register activity in the peripheral vision. Motion is particularly noticeable in the peripheral vision and can be used to attract attention. As can be seen in FIGS. 1A and 1B, the human vision is commonly divided into various sectors. The so-called central vision 101 is centered at angles of about 0-5 degrees around the fixation point, which is the point at which one's gaze is directed. This 5 degree field of central vision is usually due to a cone-shaped depression in the central retina which is called fovea.

The paracentral vision 103 is at viewing angles of about 5-8 degrees around the fixation point. This is due to a ring-shaped region surrounding the fovea, known as parafovea.

The macula, a region of the retina defined as having at least two layers of ganglia, which are bundles of nerves and neurons, may be taken as defining the boundaries of central vs. peripheral vision. The macula provides a field of vision, the so-called macular vision 105, of around 18 degrees.

The so-called near peripheral vision 107 is at a field of view of around 18-30 degrees. The so-called mid peripheral vision 109 is at a field of view of around 30-60 degrees, and the so-called far peripheral vision is at a field of view of around 60-110 degrees with regard to the point of fixation. The outer boundaries of peripheral vision correspond to the boundaries of the visual field as a whole.

For a single eye, the extent of the visual field may be defined in terms of four angles, each measured from the fixation point. These angles, representing four cardinal directions, are 60° superior (up), 60° nasal (towards the nose), 70-75° inferior (down), and 100-110° temporal (away from the nose and towards the temple). For both eyes the combined visual field is 130-135° vertical and 200-220° horizontal.

Exemplary embodiments of a vehicle information system as described herein seek to provide information to an occupant of the vehicle, the occupant may be the person in the driver's seat, such that the occupant is enabled to use his visual field which is in the regions of the near peripheral vision 107, the mid peripheral vision 109 and the far peripheral vision 111.

An exemplary embodiment of a vehicle information system is described with reference to FIG. 2 which shows in particular a perspective view of a front part of an interior of a vehicle. The interior comprises dashboard 201 with a steering wheel 203 and a central instrument panel 205. The instrument panel 205 may comprise one or more displays 207, gauges 209 and other instrumentation 211. The interior further comprises a driver's seat 213 and a front passenger seat 215. The interior of the vehicle further comprises a left sun shield 217 and a right sun shield 219. Both sun shields are mounted above the windshield 221. The vehicle further comprises in its interior an exemplary embodiment of a vehicle information system which includes at least one of pattern generators 223, 225, 227, 229, 231, and 233.

Figure 2:
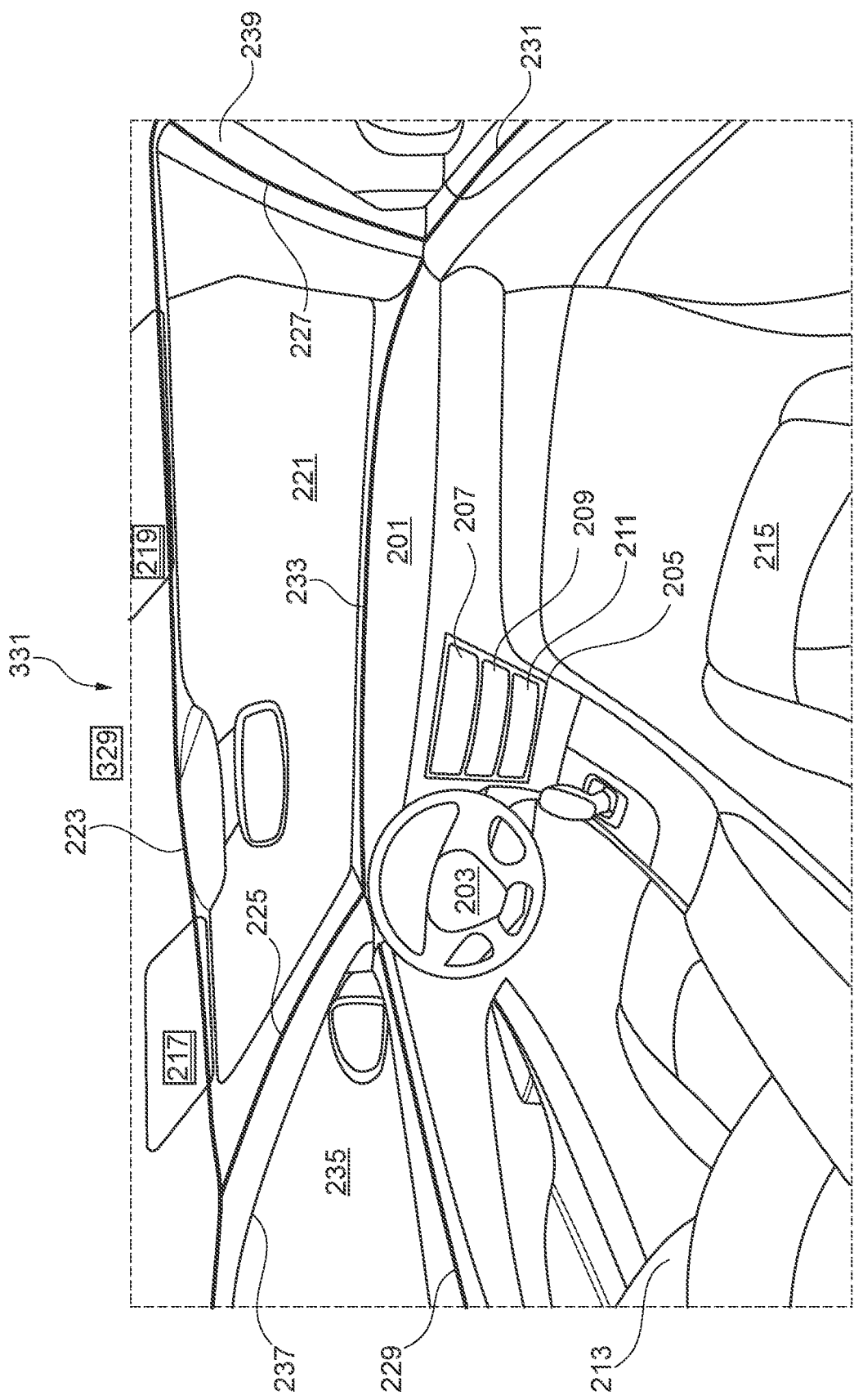
FIG. 2 illustrates various possible locations for pattern generators of an exemplary embodiment of a vehicle information system.

The pattern generator 223 is located within the interior of the vehicle and above the windshield 221 and above a left front side window 235 and above a right front side window which is not shown in FIG. 2.

The pattern generator 225 is located within the interior of the vehicle, along its left A-pillar 237. The pattern generator 227 is located within the interior of the vehicle, along its right A-pillar 239. The pattern generator 229 is located in the interior of the vehicle and below the left front side window 235. The pattern generator 229 extends along the perimeter of this window as shown in FIG. 2. The pattern generator 231 is located within the interior of the vehicle below the right front side window and follows the perimeter of this window. The patent generator 233 is located within the interior of the vehicle within or on the dashboard 201 and right below the windshield 221.

In preferred embodiments of a vehicle information system, only one or a selection of the shown pattern generators 223 to 233 is employed. In other preferred embodiments, the pattern generators 223 to 233 may represent multiple pattern generators of the vehicle information system. Thus one or multiple pattern generators can be disposed within the interior of a vehicle at different locations.

A further preferred exemplary embodiment of a vehicle information system is described with regard to FIGS. 3A to 5. For simplicity, pattern generator 301 of this vehicle information system is not shown within the interior of a vehicle, but it is placed on tripods 303, like for testing and development purposes, but the tripods 303 are not present when the pattern generator 301 is arranged within the vehicle's interior.

The pattern generator 301 may be intended to be placed within the interior of a vehicle above the windshield 221 (see FIG. 2) and above the left and right front side windows, like front side window 235 of FIG. 2. Thus, the pattern generator 301 may in substance correspond to pattern generator 223 as shown in FIG. 2.

In particular, the pattern generator 301 may be positioned within the interior of the vehicle to be viewable in the peripheral view of an occupant 305, e.g., the person seated in the driver's seat 213, when the occupant 305 is looking forward through the windshield 221 or towards displays 207, gauges 209 or other instrumentation, such as instrumentation 211, primarily positioned, for example, on the dashboard 201, for viewing by the forward looking occupant 305.

Figure 4:
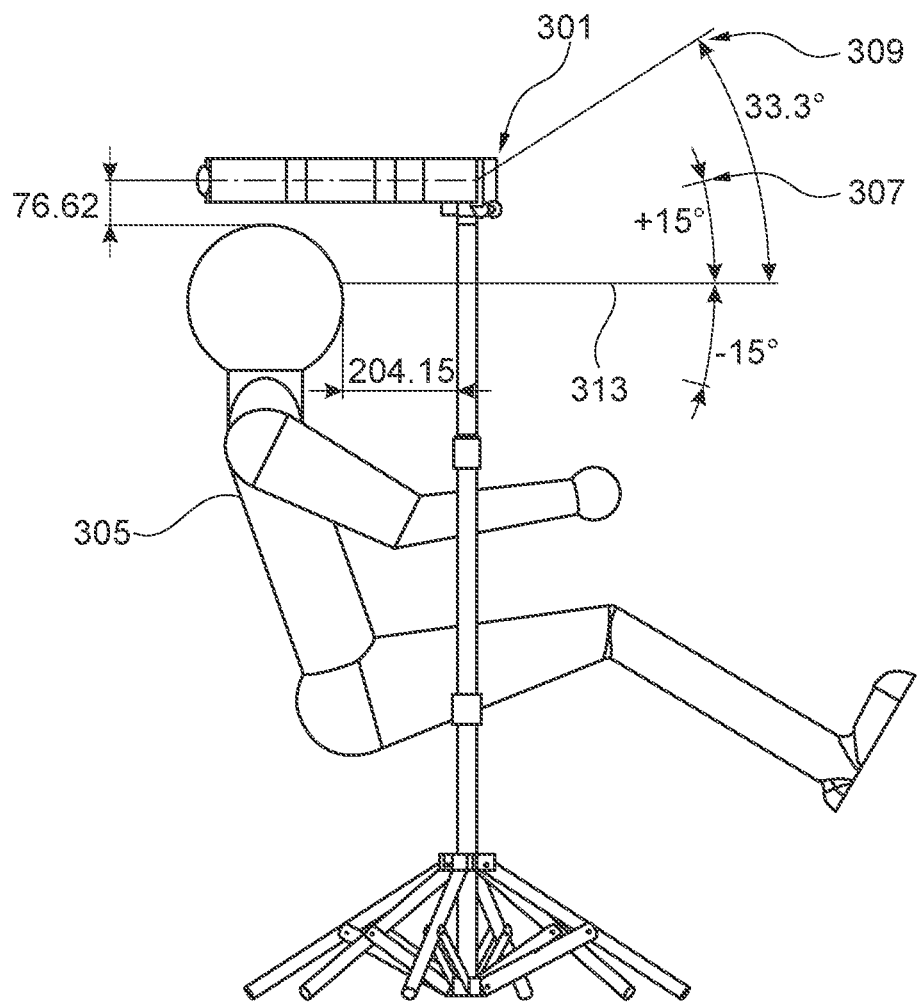
FIG. 4 shows a schematic side view of the system of FIG. 3A.

As illustrated with regard to FIG. 4, the pattern generator 301, when located above the windshield 221, will be located at a sightline 309, which is above a traffic signal sightline 307 of the occupant 305, and also above a bottom so-called cut-off sightline 311 for other vehicles being ahead of the vehicle.

The traffic signal sightline 307 may, for example, define the maximal viewing angle at which the occupant 305 can still look out of the windshield 221. Thus the traffic signal sightline 307 may, for example, in substance correspond to the line of sight where the upper end of the windshield borders the roof interior.

As indicated in FIG. 4, the pattern generator 301 may, for example, be placed at an angle of around 33 degrees above a forward line of sight 313.

Figure 5:
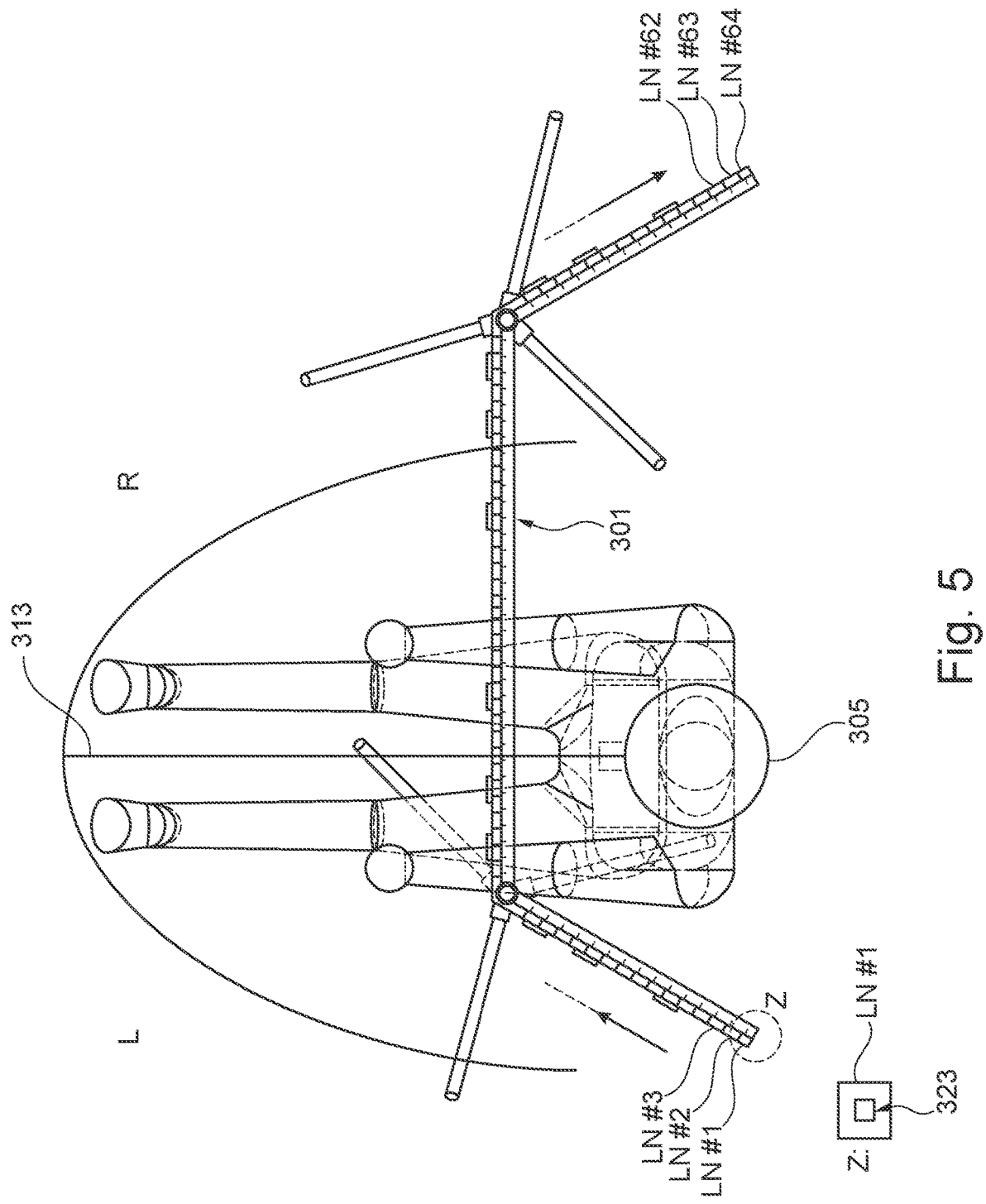
FIG. 5 shows a further schematic top view of the system of FIG. 3A.

With regard to the horizontal direction, as will be further illustrated in particular with regard to FIGS. 3B and 5, the pattern generator 301 may be located to the left up to a viewing angle of around 110° with regard to the field of view of the left eye of the occupant, and the pattern generator 301 may also be located to the right up to a viewing angle of about 110° with regard to the field of view of the right eye of the occupant 305.

Consequently, the exemplary pattern generator 301 is located within the interior of the vehicle such that during normal driving situations, when the occupant 305 is looking forward through the windshield 221, the pattern generator 301 can be seen or recognized by the occupant 305 by use of the occupant's peripheral view, without the occupant having to turn his head such that his direct line of sight changes from the forward line of sight 313 in the upward direction towards the pattern generator 301.

As shown in FIG. 3B, the pattern generator 301 can be divided into four zones: Zone 1 (reference numeral 315), zone 2 (reference numeral 317), zone 3 (reference numeral 319), and zone 4 (reference numeral 321). Furthermore, as illustrated with reference to FIG. 5, the pattern generator 301 comprises a plurality of light nodes LN. In the described exemplary embodiment, there are in total 64 light nodes. In other examples the total number of light nodes may be different, for example, in the range between 50 and 1000.

Each of the 64 light nodes is denoted with a unique number ranging from 1 to 64. The light node at the very left side of the pattern generator 301 is denoted with number 1 and the light node at the very right of the pattern generator 301 is denoted with number 64.

The table below gives an overview of the angle of each node with respect to the forward line of sight 313 which is located at 0 degrees. Angles below zero are located to the left L of the forward line of sight 313, and angles above zero are located to the right R with regard to the forward line of sight 313.

| LN Number | Angle | |
|---|---|---|
| 1 | −108.66 | L |
| 2 | −106.33 | L |
| 3 | −103.8 | L |
| 4 | −101.02 | L |
| 5 | −97.99 | L |
| 6 | −94.68 | L |
| 7 | −91.09 | L |
| 8 | −87.21 | L |
| 9 | −83.03 | L |
| 10 | −78.58 | L |
| 11 | −73.89 | L |
| 12 | −69. | L |
| 13 | −63.97 | L |
| 14 | −58.88 | L |
| 15 | −53.81 | L |
| 16 | −48.83 | L |
| 17 | −38.79 | L |
| 18 | −34.49 | L |
| 19 | −29.68 | L |
| 20 | −24.38 | L |
| 21 | −18.59 | L |
| 22 | −12.38 | L |
| 23 | −5.86 | L |
| 24 | +.82 | R |
| 25 | +7.74 | R |
| 26 | +13.93 | R |
| 27 | +20.05 | R |
| 28 | +25.72 | R |
| 29 | +30.91 | R |
| 30 | +35.59 | R |
| 31 | +39.77 | R |
| 32 | +43.51 | R |
| 33 | +46.47 | R |
| 34 | +49.47 | R |
| 35 | +52.14 | R |
| 36 | +54.52 | R |
| 37 | +56.66 | R |
| 38 | +58.54 | R |
| 39 | +60.31 | R |
| 40 | +61.87 | R |
| 41 | +63.29 | R |
| 42 | +64.58 | R |
| 43 | +65.76 | R |
| 44 | +66.84 | R |
| 45 | +67.84 | R |
| 46 | +68.75 | R |
| 47 | +69.6 | R |
| 48 | +70.38 | R |
| 49 | +73.67 | R |
| 50 | +75.72 | R |
| 51 | +77.74 | R |
| 52 | +79.71 | R |
| 53 | +81.63 | R |
| 54 | +83.5 | R |
| 55 | +85.32 | R |
| 56 | +87.09 | R |
| 57 | +88.81 | R |
| 58 | +90.47 | R |
| 59 | +92.18 | R |

| LN Number | Angle | |
| --- | --- | --- |
| 60 | +93.62 | R |
| 61 | +95.12 | R |
| 62 | +96.56 | R |
| 63 | +97.95 | R |
| 64 | +99.29 | R |

Thus light node LN with number 1 is located at an angle of −108.66 to the left (L) of the forward line of sight 313, light node LN with number 2 is located at an angle of −106.33 to the left (L) of the forward line of sight 313, and so on and so forth.

Each light node LN may comprise a light emitting element such as a LED 323, like an RGB LED (R=red, G=green, B=blue). Each light node LN may therefore be color tunable. The LED may also be a RGBW LED, where W means white.

Each light node LN, and thus each LED 323, may be operatively coupled to a controller (see controller 325 in the block diagram of FIG. 6) of the vehicle information system, and the controller may be able to individually control each light node LN, and thus each LED 323. Thus, the controller may be configured to individually switch on and off each LED 323.

In the exemplary vehicle information system as described with regard to FIGS. 3A to 5, the controller may further be configured to selectively generate a visual light pattern of a plurality of predefined visual light patterns by use of the light nodes LN of the pattern generator 301 in order to provide an information associated with the light pattern to the occupant 305.

As explained before, the occupant 305 can view the pattern generator 301 in his peripheral vision in particular when looking along the forward line of sight 313, so that each light pattern of the plurality of light patterns may have a design that is easy to grasp. Thus, each light pattern may be configured to be recognizable by the occupant 305 when seen in his periphery. The light patterns may thereby vary in color, intensity, position on the pattern generator and/or spatial motion or other characteristics so that they can be easily distinguished from each other.

The vehicle in which the vehicle information system described with regard to FIGS. 3A to 5 is employed may, for example, be an autonomous vehicle. Prior to or during carrying out a left pre-turn, followed by a left turn, the controller may generate a light pattern which is associated with this action. For example, the controller may start illuminating light node 16 and further illuminate in a filling sweep from light node 16 to light node 1 for a sharp turn of more than 90 degrees, to light node 8 for a 90 degree turn, and to light node 4 for a Y- or line change.

In order to indicate a right pre-turn and subsequent right turn, the controller may start illuminating light node 49 and then further illuminate in a filling sweep to light node 64 for a sharp right turn of more than 90 degrees, to light node 56 for a 90 degree turn, and to light node 60 for a Y- or line change.

In order to indicate that the vehicle will slow down or stop, the controller may illuminate at least some of the light nodes of zones 2 and 3 (see reference numerals 317 and 319 in FIG. 3B) which are ahead of the occupant 305. More specifically, in order to indicate a stop, the controller may start illuminating light node 32, which is the central one in the line of light nodes 1 to 64, and depending on break intensity, the controller may extend the illumination to light nodes 13 and 48 in both directions.

The controller may further be able to generate a light pattern on pattern generator 301 which may be used as an avatar to provide feedback of receiving voice commands and to visually emphasize audio/voice feedback from the vehicle to the occupant 305. Multiple avatars, which may also be called pixies, may be available and different colors may, for example, be used to differentiate them from each other.

Emergency vehicle notification and hazard warnings may be associated with a light pattern that is characterized by illumination of a single signal light node in bright light with flanking lower intensity nodes. The light nodes in the direction of the emergency vehicle or hazard may be illuminated to indicate the direction. Alternatively, a blinking may be generated over all zones 1 to 4, with alternating switch on and switch off of even and odd zones.

The various exemplary light patterns described in the preceding sections are summarized and further described in the following table:

| Sequence | Description | Location | Color |
| --- | --- | --- | --- |
| Pre-turn | Increased intensity sweep outward on same side as being turned toward | Zone 1 or 4 | Ice Blue |
| Turn | Sweep outward on same side as being turned toward; fill by turn duration | Zone 1 or 4 | Yellow |
| Lane change | Intensity fade in and out | Zone 1 or 4 | Yellow |
| Stop | Increasing intensity | Zone 2 and 3 | Red |
| Avatar | Single bright node with flanking lower intensity nodes; scans around based on command | All zones | Ice Blue |
| Emergency vehicle notification | Blinking alternating even and odd zones | All zones | Red |

Figure 6:
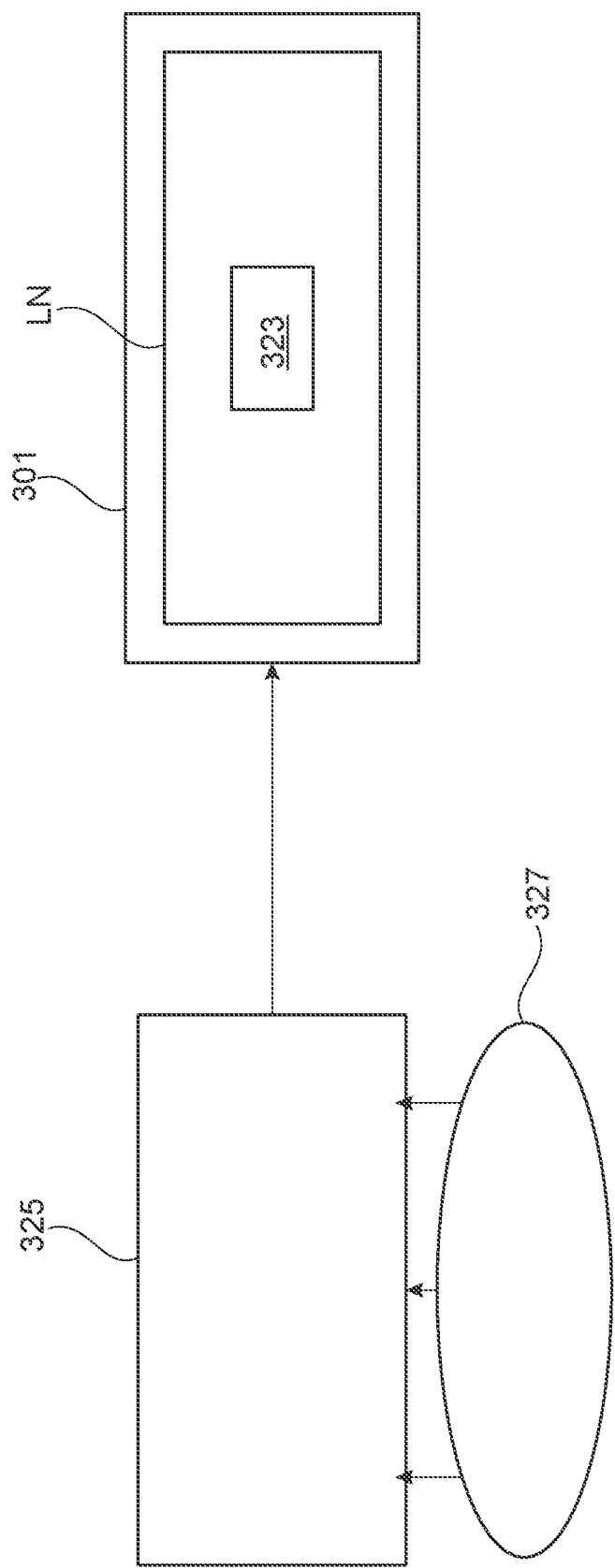
FIG. 6 shows a block diagram of an exemplary embodiment of a vehicle information system.

As shown in the block diagram of FIG. 6, an exemplary embodiment of a vehicle information system, such as the embodiment in accordance with FIGS. 3A to 5, comprises at least one pattern generator 301 having individually addressable light nodes LN, each with at least one LED 323. The vehicle information system further includes controller 325 operatively coupled to the pattern generator 301. The controller 325 may, for example, use a bus, such as a CAN-bus or a LIN-bus (LIN=Local Interconnect Network), to communicate with the pattern generator 301. The controller 325 may be operatively coupled to equipment 327 of the vehicle, such as a camera or a sensor, for example, via a CAN-Bus (CAN=Controller Area Network).

A further exemplary embodiment of a vehicle information system, which is particular useful in an autonomous vehicle, is described in the following and also with reference to the drawings.

In an autonomous vehicle, the seating may be different than in a non-autonomous vehicle, and thus the orientation of the occupants may vary or may be different from the usual orientation of the occupants seated in a non-autonomous vehicle. Occupants, also the occupant of the driver's seat 213, may not necessarily look in the forward direction through the windshield 221.

An exemplary embodiment of a vehicle information system, which is in particular suitable for an autonomous vehicle, comprises multiple pattern generators, such as the pattern generators 223-233, disposed within the interior of the vehicle at different locations. Each pattern generator 223-233 has a plurality of light nodes LN, and each light node LN comprises at least one light emitting element 323.

A sensor system 331 (see FIG. 2), which may include a camera 329, is configured to monitor the interior of the vehicle and to detect an orientation of an occupant 305 of the vehicle. In particular the sensor system 331 may be used to determine the orientation of the face of the occupant 305 and from this the line of sight of the occupant 305 may be determined. The sensor system 331 may be operatively coupled to a controller (see controller 325 in FIG. 6) which is configured to determine a specific pattern generator from the multiple pattern generators 223-233 in dependence on the detected orientation of the occupant 305 and such that the specific pattern generator is situated in the peripheral vision of the occupant 305. The controller may then generate, for example, based on input from equipment 327 of the vehicle, such as an acceleration sensor or a navigation system, and on the selected pattern generator, a visual light pattern of a plurality of predefined visual light patterns to provide information associated with the light pattern, for example, that a left or a right turn will take place, to the occupant 305 of the vehicle.

Figure 7:
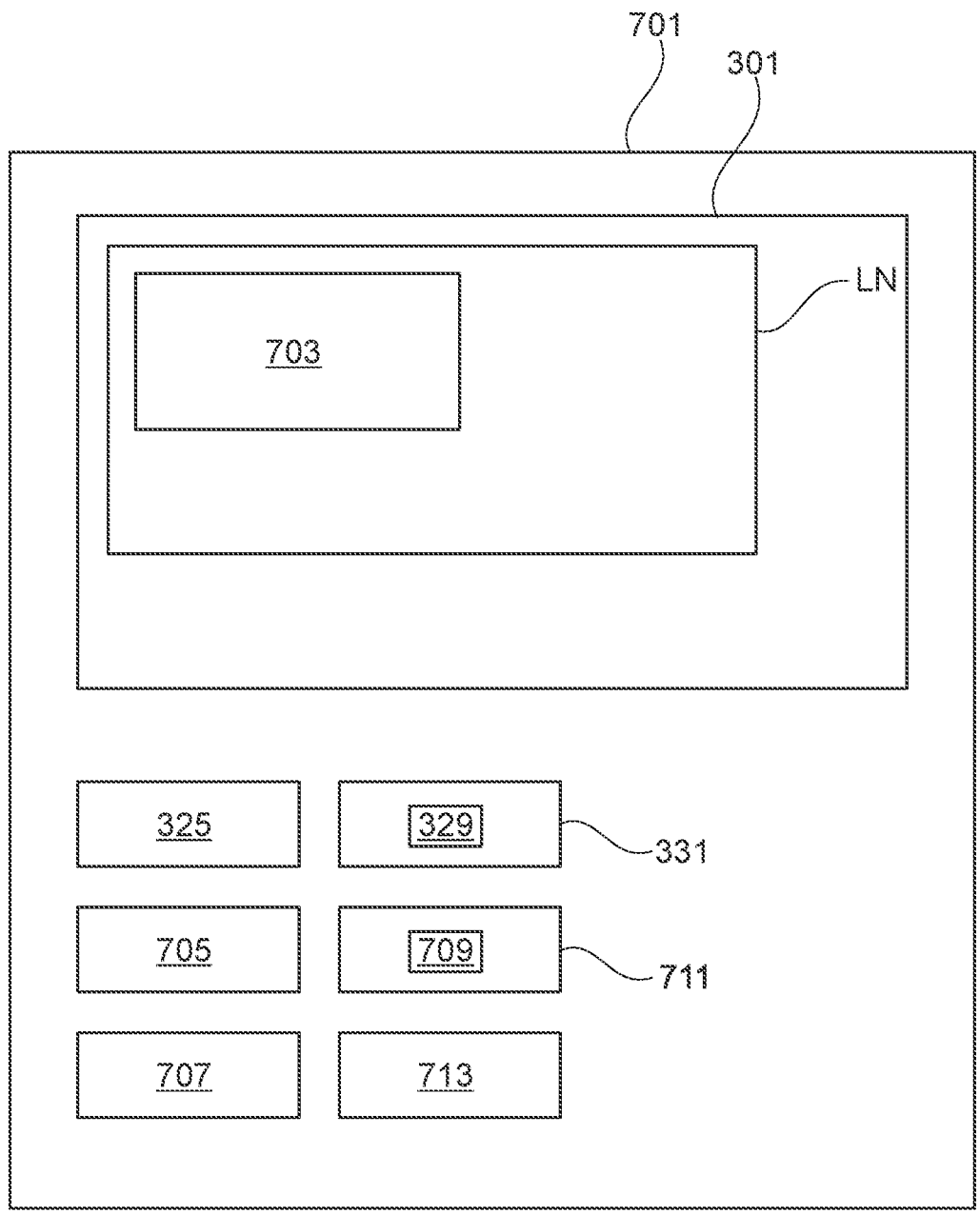
FIG. 7 shows a block diagram of a further exemplary embodiment of a vehicle information system.

In an exemplary embodiment, a vehicle information system 701, as shown in the block diagram of FIG. 7, comprises at least one pattern generator 301 having a plurality of light nodes LN, each light node comprising at least one light emitting element, such as an LED. The at least one pattern generator 301 being positioned within an interior of a vehicle to be viewable in peripheral view by an occupant (see occupant 305 in FIG. 3A) of the vehicle who is looking forward through a windshield 221 of the vehicle or towards displays 207, gauges 209 or instrumentation 211 primarily positioned for viewing by the forward looking occupant. The system 701 further comprises controller 325 which is operatively coupled to the pattern generator 301, for example, via a CAN-bus, and configured to selectively generate a visual light pattern 703 of a plurality of predefined visual light patterns on the pattern generator 301 to provide information associated with the light pattern 703 to the occupant of the vehicle.

The vehicle information system 701 may comprise a sound generation system 705 for providing spatially orientated sound indicating the position of the generated light pattern 703. The sound and the light pattern 703 may be generated synchronously.

The vehicle information system 701 may comprise a haptic feedback generation system 707 for providing haptic feedback associated with the generated light pattern 703. The haptic feedback generation system 707 may, for example, be arranged in at least one of the seats (see seats 213 and 215) of the vehicle. The haptic feedback and the light pattern 703 may be generated synchronously.

The vehicle information system 701 may comprise a sensor system 331, in particular with a camera 329 mounted in the interior of the vehicle. The sensor system 331 may be configured to monitor the interior of the vehicle and to detect the orientation of an occupant 305 in the vehicle. The sensor system 331 may be operatively coupled to the controller 325 which may be configured to select a specific pattern generator from multiple pattern generators (see generators 223-333 in FIG. 2) in dependence on a detected orientation of the occupant in the vehicle such that the selected specific pattern generator is situated in the peripheral vision of the occupant 305.

The vehicle information system 701 may further comprise a database 709 which is stored on storage 711. In the database 709, the plurality of predefined visual light patterns is stored. In the database, a one-to-one relationship between specific information and an associated light pattern is established. For example, a specific light pattern is associated with the information that the vehicle will carry out a left turn. The controller 325 may further be operatively coupled with a navigation system 713 or another equipment of the vehicle which may provide the information to the controller 325 that the vehicle will turn to the left. The controller 325 may then access the database and determine the specific light pattern which is associated with the information "left turn ahead". The selected light pattern will then be generated by use of the pattern generator 301 to provide the information to the occupant 305 that a left turn is happening soon.

The vehicle information system 701 may be adapted to the position, orientation and viewing direction of the occupant using the orientation of the occupant determined by the sensor system 331. In some embodiments this adaptation may be initiated manually or carried out automatically when an occupant is seated in the vehicle, or intermittently or continually as long as the occupant 305 is present in the vehicle.

Adjustment or adaptation of the vehicle information system 701 may include selection of a specific one of a plurality of pattern generators (see pattern generators 223-233) based on where that specific pattern generator is located with respect to the orientation of the occupant 305. A pattern generator that is determined to be located in the peripheral vision of the occupant is preferably the one that is selected. In some embodiments several pattern generators may be selected simultaneously, either because they are all located in the peripheral vision of a single occupant, or because they are in the peripheral vision of respective ones of several occupants. This is particularly advantageous in an autonomous vehicle where the seat locations of the passengers may be adjustable such that the actual position and orientation of an occupant cannot be reliably predicted.

The controller 325 may be an on-board computer or some special purpose computing device, and it may be realized as a combination of hardware processing capabilities, various memory modules and other necessary components such as communication buses and interfaces, and software modules stored in the memory modules and including instructions that can be executed by the processor. The controller may also, in whole or in part, be implemented as an application-specific integrated circuit (ASIC), as a field-programmable gate array (FPGA), or a system-on-a-chip (SoC).

The controller 325 can be configured to determine the information in dependence on a vehicle status or a planned motion of the vehicle and to select the visual light pattern from the plurality of light patterns based on the determined information. As such the controller may be a separate component capable of communicating with an autonomous driving system or systems and receive information therefrom, or it may simply be a module or a component of a vehicle control system such as an autonomous driving system.

The sensor system 331 may provide the controller 325 with sensor data from at least one sensor. The sensor may be: a camera, motion detector, accelerometers, system warnings (including but not limited to warnings from the autonomous driving system), a sensor for outside temperature, microphones, etc. The controller may be programmed to analyze the senor data and to classify the data received. The controller may be programed to prioritize the classified data and to provide a visual light pattern according to the data with the highest priority.

The reaction time of changing the light patterns in response to system inputs (e.g., CAN from sensors) may be fast enough to provide smooth transitions for rapidly sweeping or dynamic lighting and react to input from sensors.

In some embodiments the controller 325 may display individual information to each occupant in the same vehicle. The controller 325 may be configured to determine that different information is relevant to different occupants based on their roles (e.g., the relevance of a road hazard to a driver vs. to a passenger in vehicles that are not autonomous or not fully autonomous) or based on their orientation (e.g., the relevance or nature of a planned maneuver to an occupant facing forward vs. an occupant facing sideways).

In some embodiments preferences in the vehicle information system 701, such as the predefined light patterns, may be configured by the occupant.

In some embodiments the senor system 331 can include a set of sensors capable of detecting (or enabling the controller 325 to determine) characteristics of the occupants, including size, demographics, mobility and physical orientations in the vehicle. Based on the received senor data the controller can adapt settings, such as the analyses of other senor data, the classification of senor data, the prioritization of the classified data and the predefined light patterns. This adaptation by the controller will provide the occupants with custom made information, making it more intuitive for the occupants to understand or react to vehicle information.

According to some embodiments a user interface may be provided which enables the controller to receive commands or status inquiries from an occupant or operator. Information related to the commands and inquiries can be presented to the occupant via visual light patterns, but may in some embodiments be presented on a display of the user interface. In some embodiments the controller may be configured to use an already installed user interface of the vehicle, for example, on the dashboard of the vehicle.

The number of light nodes LN could be anywhere from low resolution (less than 100) to high resolution (many thousands). For dimming the light nodes LN with enough control a reasonable resolution may be required (e.g., at least 10 bit dimming on each channel). For high node numbers this means a high data transfer rate to the light nodes (e.g., greater than 1 Mbps).

The vehicle information system 701 may include many light nodes LN at various angles with respect to the observer's visual field of view. The system 701 may have light nodes outside the occupant's immediate field of view to allow head movements and changes in orientation of the occupant. The light nodes may include one or multiple sets of LED chips. The nodes can form a visual pattern. The nodes can act together with similar intensity, color, and tempo to simply cover a larger area of the observer field of view and give a sense of spatial coverage or size or the nodes may create a pattern recognizable by an observer in the direct view. In one embodiment the pattern could be an arrow resembling a green turn indicator icon for turn use cases.

Figure 8:
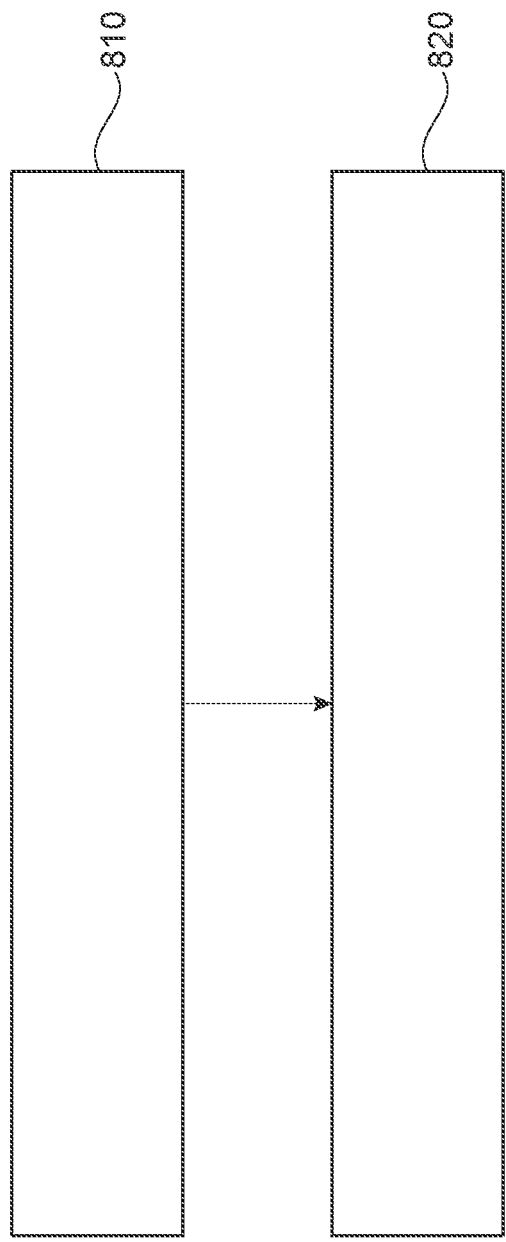
FIG. 8 shows a flow diagram of an exemplary embodiment of a method of providing information to an occupant of a vehicle.

FIG. 8 provides a flow diagram for a method of providing information to an occupant of a vehicle. Box 810 illustrates the step of selecting a visual light pattern from a plurality of predefined light patterns. The selected visual light pattern is associated with information to be provided to the occupant. Box 810 illustrates the step of selectively generating, preferably by use of a controller to which at least one pattern generator is operatively coupled, the selected visual light pattern on at least one pattern generator configured to visualize the selected visual light pattern to provide the information to the occupant.

The method may further include the step of providing the at least one pattern generator having a plurality of light nodes, each light node comprising at least one light emitting element, such as an LED, within an interior of a vehicle to be viewable in peripheral view by an occupant of the vehicle who is looking forward through a windshield of the vehicle or towards displays, gauges or instrumentation primarily positioned for viewing by a forward looking occupant.

Figure 9:
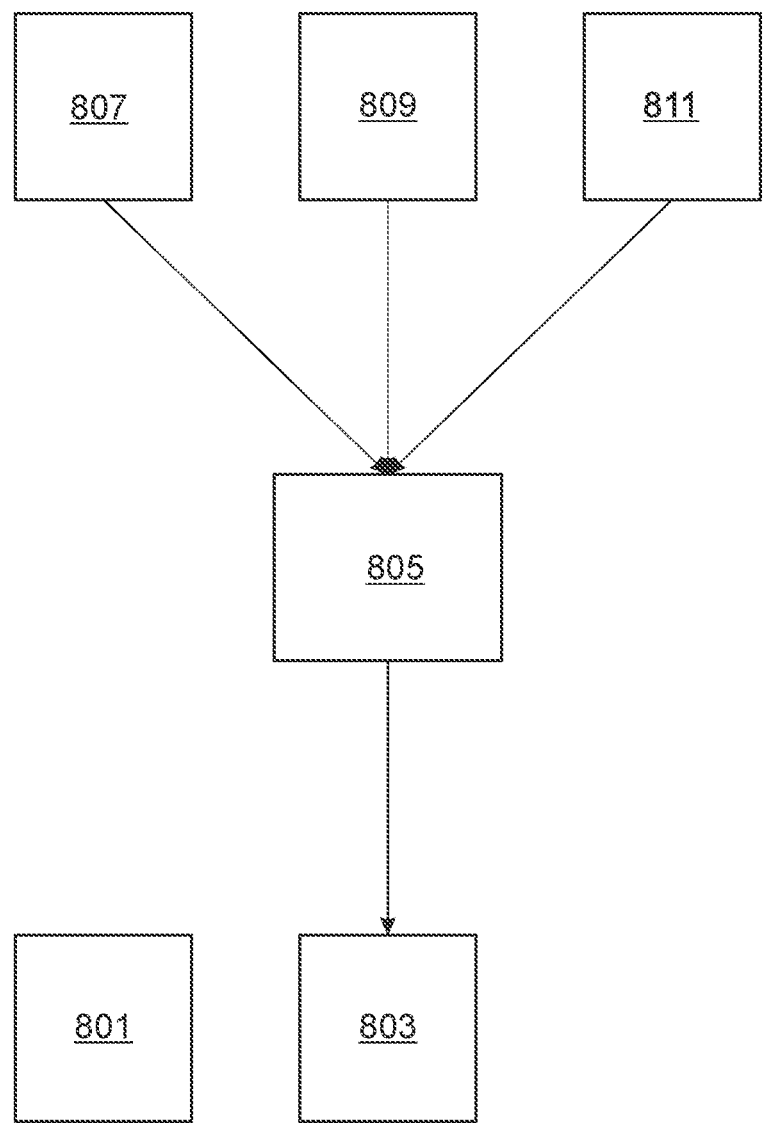
FIG. 9 shows a block diagram of an exemplary embodiment of an apparatus.

The block diagram of FIG. 9 shows an apparatus comprising a viewing window 801, which may be a display when the apparatus is an electronic device such as a virtual reality google, or a windshield when the apparatus is a vehicle. The viewing window is an element at which, under normal circumstances, a user of the apparatus looks at or looks through when the apparatus is in use.

The apparatus further comprises an information system having at least one pattern generator 803 which is provided with, as the previous described pattern generators, a plurality of light nodes. Each light node comprises at least one light emitting element, such as an LED. The pattern generator 803 is positioned with regard to the viewing window 801 in the apparatus such that it is located in the peripheral view of the user when the user looks at or through the viewing window 801.

The apparatus further comprises a controller 805 which is operatively coupled to the pattern generator 803 and configured to initiate the generation of a visual light pattern on the pattern generator 803. The visual light pattern is thereby indicative of information which is to be provided to the user of the apparatus. For example, as outlined before, the pattern generator may output a visual light pattern that indicates an upcoming turn to the occupant of a vehicle.

The controller 805 may be adapted to select the visual light pattern from a plurality of predefined light patterns which are stored on a database (see database 709 in FIG. 7). The predefined light patterns may also be modifiable by the controller, for example, in dependence on received information as will be described below. Furthermore, if a modified light pattern is generated by the controller, the basic light pattern may not be output by the pattern generator 803.

The controller 805 is connected or connectable to a first information provider 807, a second information provider 809 and a third information provider 811 for receiving—from at least one of the information providers 807-811—data which is related to the apparatus and/or the user.

The information provider 807, for example, may be a sensor attached at the apparatus or, in case of a vehicle, a navigation system or another system of a vehicle which can provide information or data. The sensor may, for example, be a camera monitoring the interior of a vehicle.

The information provider 809 may be a cloud service accessible via the internet. The information provider 811 may be a wearable electronic device, such as a fitness tracker, which is worn by a user and to which the controller 805 is also connected, e.g., via Bluetooth. The controller 805 may be connected via a wired or wireless connection to the information provider 807 and/or to the information provider 809.

The data received from the information providers 807, 809, 811 may be any kind of data associated with the apparatus and/or the user. For example, the apparatus may be a vehicle, and the controller 805 may receive from one of the information providers 807-811 medical data about the user, user preferences, user information, traffic data, emergency data, and/or weather data.

The controller may be configured to modify the visual light pattern in dependence on the data and to initiate the generation of the modified visual light pattern on the pattern generator. The data may be related to at least one of the apparatus and the user, and the controller may be configured to initiate the generation of the modified visual light pattern on the pattern generator.

The controller 805 may further be configured to modify a visual light pattern which is intended for an output to the user in dependence on the received data. The controller 805 may further be configured to initiate the generation of the modified visual light pattern on the pattern generator 803.

For example, the visual light pattern used to warn an occupant of an approaching emergency vehicle may be modified with regard to intensity, color and blinking speed in dependence on the distance of the emergency vehicle to the vehicle, and the modified visual light pattern may be output by the pattern generator 803.

The controller 805 may also be configured to obtain at least one visual light pattern from an external source, for example, by downloading a light pattern from the cloud service 809. The controller 805 may further be configured to modify the obtained visual light pattern in dependence on data received from one of the information providers 807-809.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Exemplary non-limiting systems and methods are set out in the following items:

1. An apparatus comprising:
a pattern generator having a plurality of light nodes, each light node comprising a light emitting element, the pattern generator being positioned in a peripheral view of a user of the apparatus; and
a controller operatively coupled to the pattern generator and configured to selectively initiate generation of a visual light pattern on the pattern generator, the visual light pattern being indicative of information that is to be provided to the user of the apparatus.

2. The apparatus of item 1, wherein the controller is adapted to select the visual light pattern from a plurality of light patterns.

3. The apparatus of one of the preceding items, wherein the controller is connected or connectable to an information provider to receive data related to the apparatus and the user from the information provider.

4. The apparatus of item 3, wherein the controller is configured to modify the visual light pattern based on the data and to initiate the generation of the modified visual light pattern on the pattern generator.

5. The apparatus of one of the preceding items 1, wherein the controller is configured to obtain a visual light pattern from an external source.

6. The apparatus of item 5, wherein the controller is configured to modify the visual light pattern based on data received from an information provider, the data being related to the apparatus or the user, and wherein the controller is configured to initiate the generation of the modified visual light pattern on the pattern generator.

7. The apparatus of one of the preceding items, wherein the apparatus is a vehicle, wherein the controller and the pattern generator are part of a vehicle information system, wherein the user is an occupant of the vehicle, and wherein the pattern generator is positioned within an interior of the vehicle such that it is viewable in peripheral view by the occupant of the vehicle.

8. The apparatus of one of the preceding items, wherein the visual light pattern is configured to be recognizable by the user when seen in peripheral vision.

9. The apparatus of one of the preceding items, wherein the visual light pattern is generated on the pattern generator by switching on, for a predetermined period of time, the light emitting elements of at least one set of light nodes of the plurality of light nodes associated with the visual light pattern while keeping switched off the light emitting elements of remaining sets of light nodes of the plurality of light nodes.

9'. The apparatus of one of one of the preceding items, wherein the visual light pattern is generated on the pattern generator by use of a time sequence of predefined sub-patterns of light, each sub-pattern of light being generated by switching on, for a predetermined period of time, the light emitting elements of a predefined set of light nodes of the plurality of light nodes associated with a particular sub-pattern.

10. The apparatus of one of the preceding items, wherein the apparatus is a vehicle and the controller is configured to determine the information in based on a vehicle status or a planned motion of the vehicle and to initiate the generation of the visual light pattern based on the determined information on the pattern generator.

11. The apparatus of one of the preceding items, wherein each light node is configured to emit light in a monochromatic color, or each light node is configured to change a color of the emitted light.

12. The apparatus of one of the preceding items, wherein the apparatus is a vehicle and the pattern generator is positioned at a location within an interior of the vehicle, the location being selected from one or more of above a windshield, along an A-pillar of the vehicle, along a B-pillar of the vehicle, along a C-pillar of the vehicle, above or below a window of the vehicle, following a perimeter of a window of the vehicle, embedded in a window of the vehicle, embedded in a door of the vehicle, embedded in a material of the interior of the vehicle, in a peripheral viewing region of a head-mounted virtual, augmented, or mixed reality system of the vehicle.

13. The apparatus of one of the preceding items, wherein the apparatus is a vehicle and wherein multiple pattern generators are disposed within an interior of the vehicle at different locations.

14. The apparatus of item 13, wherein the apparatus comprises a sensor system configured to monitor the interior of the vehicle and to detect an identity, orientation, or gaze direction of an occupant in the vehicle.

15. The apparatus of item 13 or 14, wherein the sensor system comprises a plurality of sensors operatively coupled to the controller, the controller being configured to determine a specific pattern generator from the multiple pattern generators based on the detected identity, orientation, or gaze direction of the occupant in the vehicle such that the specific pattern generator is situated in a peripheral vision of the occupant.

16. The apparatus of one of the preceding items, wherein the apparatus comprises a sound generation system configured to provide spatially orientated sounds indicating a position of a generated light pattern.

17. The apparatus of one of the preceding items, wherein the apparatus comprises a haptic feedback generation system configured to provide haptic feedback associated with the generated light pattern.

18. A vehicle information system of a vehicle, the system comprising:
a plurality of pattern generators disposed at different locations within an interior of the vehicle, each pattern generator having a plurality of light nodes, each light node comprising a light emitting element; and
a sensor system configured to detect an orientation and gaze direction of an occupant of the vehicle, the sensor system being operatively coupled to a controller that is configured to determine a specific pattern generator from the plurality of pattern generators in based on the detected orientation or gaze direction of the occupant.

19. The system of item 18, wherein the specific pattern generator is selected such that it is located in a peripheral vision of the occupant.

20. The system of item 18 or 19, wherein the pattern generators are operatively coupled to the controller, and wherein the controller is configured to selectively initiate, on the specific pattern generator, the generation of a visual light pattern to provide information associated with the visual light pattern to the occupant.

21. A method of providing information to a user of an apparatus, the method comprising:
determining a visual light pattern associated with information to be provided to the user, the visual light pattern being determined in dependence on data related to the apparatus or the user; and
outputting the visual light pattern on a pattern generator configured to visualize the visual light pattern to provide the information to the user.

22. An apparatus comprising a vehicle or a vehicle information system of a vehicle, the apparatus comprising a plurality of lighting diodes arranged in or on the apparatus within a peripheral view of an occupant in a driver's seat of the vehicle, when the occupant is looking at a viewing window of the apparatus or at an object within the apparatus.

23. A method of providing information to an occupant in a driver's seat of a vehicle, the method comprising:
determining that the occupant is looking at a first location within the vehicle;
determining a visual light pattern associated with information to be provided to the occupant, the visual light pattern being determined based on data related to the vehicle or the occupant; and
outputting the visual light pattern on a pattern generator comprising a plurality of lighting diodes arranged in a peripheral view of the occupant when the occupant is looking at a first location within the vehicle, the visual light pattern to provide the information to the user.

24. The method of item 23, wherein, after outputting the visual light pattern, the method further comprises:
determining that the occupant is looking at a second location within the vehicle, the second location being different than the first location;
determining a second visual light pattern associated with information to be provided to the occupant, the second visual light pattern being determined based on data related to the vehicle or the occupant, the second visual light pattern being the same or different than the visual light pattern; and
outputting the second visual light pattern on a second pattern generator comprising a different plurality of lighting diodes arranged in an updated peripheral view of the occupant when the occupant is looking at the second location within the vehicle, the second visual light pattern to provide the information to the user.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An apparatus comprising:
a plurality of pattern generators, each pattern generator having a plurality of light nodes, each light node comprising a light emitting element, the pattern generators being positioned at different locations around an interior of the apparatus and around a user located within the apparatus;
a controller operatively coupled to the plurality of pattern generators and configured to selectively initiate generation of a visual light pattern on at least one of the plurality of pattern generators, the visual light pattern being recognizable by the user when seen in peripheral vision and indicative of information that is to be provided to the user; and
a sensor system configured to monitor the interior of the apparatus and to detect a gaze direction of the user, wherein the sensor system comprises a plurality of sensors operatively coupled to the controller, the controller being configured to generate the visual light pattern on at least one specific pattern generator from the plurality of pattern generators in response to the detected gaze direction of the user, wherein the at least one specific pattern generator is located only in a peripheral vision of the user,
wherein the apparatus is an autonomous vehicle,
wherein the controller and the plurality of pattern generators are part of a vehicle information system,
wherein the user is an occupant of the vehicle,
wherein the plurality of pattern generators are positioned within the interior of the vehicle such that at least one of the plurality of pattern generators is viewable in peripheral view by the occupant of the vehicle, and
wherein the controller is configured to generate the visual pattern by determining a zone to indicate that the vehicle will perform a left turn, perform a right turn, slow down or stop.

2. The apparatus of claim 1, wherein the controller is adapted to select the visual light pattern from a plurality of light patterns.

3. The apparatus of claim 1, wherein the controller is connected or connectable to an information provider to receive data related to the apparatus and the user from the information provider.

4. The apparatus of claim 3, wherein the controller is configured to modify the visual light pattern based on the data and to initiate the generation of the modified visual light pattern on the at least one specific pattern generator or on any other of the plurality of pattern generators being in peripheral vision of the user.

5. The apparatus of claim 1, wherein the controller is configured to obtain a visual light pattern from an external source.

6. The apparatus of claim 5, wherein the controller is configured to modify the visual light pattern based on data received from an information provider, the data being related to the apparatus or the user, and wherein the controller is configured to initiate the generation of the modified visual light pattern on the at least one specific pattern generator or on any other of the plurality of pattern generators being in peripheral vision of the user.

7. The apparatus of claim 1,
wherein the visual light pattern is generated on the at least one specific pattern generator by switching on, for a predetermined period of time, the light emitting elements of at least one set of light nodes of the plurality of light nodes associated with the visual light pattern while keeping switched off the light emitting elements of remaining sets of light nodes of the plurality of light nodes.

8. The apparatus of claim 1, wherein the apparatus is a vehicle and the controller is configured to determine the information based on a vehicle status or a planned motion of the vehicle and to initiate the generation of the visual light pattern based on the determined information on the at least one specific pattern generator or on any other of the plurality of pattern generators being in peripheral vision of the user.

9. The apparatus of claim 1, wherein each light node is configured to emit light in a monochromatic color.

10. The apparatus of claim 1, wherein the apparatus is a vehicle and the plurality of pattern generators are positioned at locations within the interior of the vehicle, each location being a location selected from the group consisting of:
above a windshield,
along an A-pillar of the vehicle,
along a B-pillar of the vehicle,
along a C-pillar of the vehicle,
above or below a window of the vehicle,
following a perimeter of a window of the vehicle,
embedded in a window of the vehicle,
embedded in a door of the vehicle,
embedded in a material of the interior of the vehicle, and
in a peripheral viewing region of a head-mounted virtual, augmented, or mixed reality system of the vehicle.

11. The apparatus of claim 1, wherein the apparatus comprises a sound generation system configured to provide spatially orientated sounds indicating a position of a generated light pattern.

12. The apparatus of claim 1, wherein the apparatus comprises a haptic feedback generation system configured to provide haptic feedback associated with the generated light pattern.

13. A method of providing information to a user of an apparatus, the method comprising:
determining a visual light pattern associated with information to be provided to the user, the visual light pattern being determined in dependence on data related to the apparatus or the user;
detecting a first gaze direction of the user;
determining a first zone of a plurality of zones of a pattern generator having a plurality of light nodes to output the visual light pattern, the first zone being in a peripheral vision of the user based on the first gaze direction;
outputting the visual light pattern on the first zone of the pattern generator so that the visual light pattern is visualized by the user in the peripheral vision of the user;
detecting that the first gaze direction of the user has changed to a second gaze direction;
determining a second zone of a plurality of zones of a pattern generator to output the visual light pattern, the second zone being different than the first zone and in an updated peripheral vision of the user based on the second gaze direction; and
outputting the visual light pattern on the second zone of the pattern generator so that the visual light pattern is visualized by the user in the updated peripheral vision of the user,
wherein the apparatus is an autonomous vehicle and the user is an occupant of the autonomous vehicle, and wherein determining the first zone and determining the second zone each comprises determining a zone to indicate that the vehicle will perform a left turn, or
wherein the apparatus is an autonomous vehicle and the user is an occupant of the autonomous vehicle, and wherein determining the first zone and determining the second zone each comprises determining a zone to indicate that that the vehicle will perform a right turn.

14. The method of claim 13,
wherein the plurality of zones are disposed at different locations within an interior of the vehicle; and
wherein the pattern generator is positioned within an interior of the vehicle such that it is viewable in peripheral view by the occupant of the vehicle.

15. The method of claim 13, wherein determining the first zone and determining the second zone each comprises determining a zone to indicate that the vehicle will slow down or stop.

16. An autonomous vehicle comprising:
a plurality of pattern generators, each pattern generator having a plurality of light nodes, each light node comprising a light emitting element, the pattern generators being positioned at different locations around an interior of the vehicle and around an occupant located within the vehicle; and
a vehicle information system that includes a controller and the plurality of pattern generators, the vehicle information system configured to:
determine a visual light pattern associated with information to be provided to the occupant, the visual light pattern being determined in dependence on data related to the vehicle or the occupant;
detect a first gaze direction of the occupant;
determine a first zone of a plurality of zones of the pattern generator to output the visual light pattern, the first zone to indicate that the vehicle will perform a left turn, perform a right turn, slow down or stop;
output the visual light pattern on the first zone of the pattern generator so that the visual light pattern is visualizable by the occupant in a peripheral vision of the occupant;
detect that the first gaze direction of the occupant has changed to a second gaze direction;
determine a second zone of a plurality of zones of a pattern generator to output the visual light pattern, the second zone being different than the first zone and in an updated peripheral vision of the occupant based on the second gaze direction, the second zone to indicate that the vehicle will perform a left turn, perform a right turn, slow down or stop; and
output the visual light pattern on the second zone of the pattern generator so that the visual light pattern is visualizable by the occupant in the updated peripheral vision of the occupant.

17. A method of providing information to a user of an apparatus, the method comprising:

determining a visual light pattern associated with information to be provided to the user, the visual light pattern being determined in dependence on data related to the apparatus or the user;

detecting a first gaze direction of the user;

determining a first zone of a plurality of zones of a pattern generator having a plurality of light nodes to output the visual light pattern, the first zone being in a peripheral vision of the user based on the first gaze direction;

outputting the visual light pattern on the first zone of the pattern generator so that the visual light pattern is visualized by the user in the peripheral vision of the user;

detecting that the first gaze direction of the user has changed to a second gaze direction;

determining a second zone of a plurality of zones of a pattern generator to output the visual light pattern, the second zone being different than the first zone and in an updated peripheral vision of the user based on the second gaze direction; and outputting the visual light pattern on the second zone of the pattern generator so that the visual light pattern is visualized by the user in the updated peripheral vision of the user, wherein the apparatus is an autonomous vehicle and the user is an occupant of the autonomous vehicle, and wherein determining the first zone and determining the second zone each comprises determining a zone to indicate that the vehicle will slow down or stop.

18. The apparatus of claim 1, wherein the visual light pattern is generated on the at least on specific pattern generator by use of a time sequence of predefined sub-patterns of light, each sub-pattern of light being generated by switching on, for a predetermined period of time, the light emitting elements of a predefined set of light nodes of the plurality of light nodes associated with a particular sub-pattern.

19. The apparatus of claim 1, wherein each light node is configured to change a color of the emitted light.

20. The autonomous vehicle of claim 16, further comprising a sound generation system configured to provide spatially orientated sounds indicating a position of a generated light pattern.

* * * * *